(12) United States Patent
Uhlenkamp et al.

(10) Patent No.: US 11,644,129 B2
(45) Date of Patent: May 9, 2023

(54) SANITARY FITTING CONNECTION

(71) Applicant: DCI, INC., St. Cloud, MN (US)

(72) Inventors: Brian J. Uhlenkamp, St. Cloud, MN (US); Shawn P. Pitt, St. Cloud, MN (US)

(73) Assignee: DCI, INC., St. Cloud, MN (US)

( * ) Notice: Subject to any disclaimer, the term of this patent is extended or adjusted under 35 U.S.C. 154(b) by 263 days.

(21) Appl. No.: 16/838,278

(22) Filed: Apr. 2, 2020

(65) Prior Publication Data

US 2020/0232560 A1 Jul. 23, 2020

Related U.S. Application Data

(60) Continuation of application No. 15/952,639, filed on Apr. 13, 2018, now Pat. No. 10,641,394, which is a division of application No. 12/354,083, filed on Jan. 15, 2009, now abandoned.

(60) Provisional application No. 61/021,272, filed on Jan. 15, 2008.

(51) Int. Cl.
*F16L 17/06* (2006.01)
*F16J 15/10* (2006.01)
*F16L 23/22* (2006.01)
*F16J 15/06* (2006.01)
*F16L 21/02* (2006.01)
*F16L 15/04* (2006.01)

(52) U.S. Cl.
CPC ............ *F16L 17/06* (2013.01); *F16J 15/061* (2013.01); *F16J 15/062* (2013.01); *F16J 15/104* (2013.01); *F16J 15/106* (2013.01); *F16L 15/04* (2013.01); *F16L 21/02* (2013.01); *F16L 23/22* (2013.01)

(58) Field of Classification Search
CPC . F16L 15/04; F16L 17/06; F16L 21/02; F16L 23/22; F16J 15/061; F16J 15/062; F16J 15/104; F16J 15/106
See application file for complete search history.

(56) References Cited

U.S. PATENT DOCUMENTS

| 332,667 | A | | 12/1885 | Lyons |
| 508,765 | A | | 11/1893 | Rouse |
| 1,477,696 | A | * | 12/1923 | Dollman ................. F16L 23/22 |
| | | | | 285/368 |
| 2,342,422 | A | | 2/1944 | Morehead et al. |
| 2,462,596 | A | | 2/1949 | Bent |
| 2,599,767 | A | | 6/1952 | Long |

(Continued)

*Primary Examiner* — Nicholas L Foster
(74) *Attorney, Agent, or Firm* — Dorsey & Whitney LLP

(57) ABSTRACT

In one example, a hygienic fitting assembly is disclosed. The hygienic fitting assembly includes a first fitting member defining an exterior opening, an interior opening, and a passage extending therebetween. The hygienic fitting assembly further includes a second fitting member receivable by the first fitting member with the first and second fitting members configured for removable mechanical attachment with one another along an interface region within the passage. The hygienic fitting assembly further includes a seal formed from a compression controlled and self-lubricating material. The seal is configured to receive an annular feature of one of the first or second fitting members and define sanitary fitting connection therebetween. The sanitary fitting connection is operable to prevent fluid escape toward the interface region during flow of a product between the first and second fitting members.

20 Claims, 18 Drawing Sheets

(56) References Cited

U.S. PATENT DOCUMENTS

| | | | |
|---|---|---|---|
| 2,867,463 A * | 1/1959 | Snider | F16L 25/023 |
| | | | 277/614 |
| 3,406,409 A * | 10/1968 | Burns | E03D 11/14 |
| | | | 4/252.2 |
| 3,494,708 A | 2/1970 | Nunlist et al. | |
| 3,526,467 A | 9/1970 | Kime | |
| 3,819,211 A | 6/1974 | Knox | |
| 3,836,183 A | 9/1974 | Battle | |
| 3,851,899 A * | 12/1974 | Franz | H01L 21/00 |
| | | | 285/95 |
| 3,865,386 A | 2/1975 | Wilke | |
| 3,990,711 A | 11/1976 | Hill | |
| D256,046 S | 7/1980 | Perrin | |
| 4,388,259 A | 6/1983 | Jewell et al. | |
| 4,441,724 A | 4/1984 | Taylor | |
| 4,585,026 A * | 4/1986 | Norton | F16K 1/2263 |
| | | | 277/634 |
| 4,621,843 A * | 11/1986 | Straub | F16L 19/07 |
| | | | 285/356 |
| 4,628,574 A | 12/1986 | Lerman | |
| 4,779,903 A * | 10/1988 | Maier | F16L 25/14 |
| | | | 285/341 |
| 5,095,554 A * | 3/1992 | Gloor | E03C 1/104 |
| | | | 4/678 |
| 5,118,141 A * | 6/1992 | Miyashita | F16J 15/0893 |
| | | | 285/23 |
| 5,151,606 A | 9/1992 | Grieve | |
| 5,152,606 A | 10/1992 | Borraccia et al. | |
| 5,466,016 A * | 11/1995 | Briody | F16L 41/082 |
| | | | 29/523 |
| 5,516,122 A * | 5/1996 | Caffee | F16L 23/20 |
| | | | 285/918 |
| 5,749,586 A * | 5/1998 | Abe | F16J 15/104 |
| | | | 264/234 |
| 5,947,533 A | 9/1999 | Fisher et al. | |
| 6,039,319 A | 3/2000 | Coonce et al. | |
| 6,045,033 A | 4/2000 | Zimmerly | |
| 6,073,969 A | 6/2000 | Zimmerly | |
| 6,260,854 B1 | 7/2001 | Lemon | |
| 6,435,832 B1 | 8/2002 | Fasano | |
| 6,450,506 B1 | 9/2002 | Krieg et al. | |
| 6,561,522 B1 | 5/2003 | Radelet et al. | |
| 6,581,941 B2 | 6/2003 | Carr | |
| 6,742,923 B2 | 6/2004 | Blakley et al. | |
| 6,857,638 B2 | 2/2005 | Dupont et al. | |
| 7,018,177 B2 | 3/2006 | Feher | |
| 7,121,589 B2 * | 10/2006 | Hawkinson | E03B 11/02 |
| | | | 285/139.2 |
| 7,237,778 B1 | 7/2007 | Althouse | |
| 8,567,827 B2 * | 10/2013 | McGuire | F16L 19/00 |
| | | | 285/91 |
| 8,573,654 B2 * | 11/2013 | Kishi | F16L 27/1275 |
| | | | 285/110 |
| 9,249,909 B2 | 2/2016 | Ikushima | |
| 9,447,909 B2 * | 9/2016 | Smith | F16L 15/04 |
| 9,488,300 B2 * | 11/2016 | Kishi | F16L 21/03 |
| 9,500,319 B2 * | 11/2016 | Lingvall | F17D 1/00 |
| 9,719,618 B2 * | 8/2017 | Kishi | F16L 17/032 |
| 10,006,572 B2 * | 6/2018 | Kishi | F16L 21/04 |
| 10,480,692 B2 * | 11/2019 | Smith | F16L 15/08 |
| 10,520,119 B2 * | 12/2019 | Kishi | F16L 21/08 |
| 2004/0232697 A1 * | 11/2004 | Tomita | F16L 37/0915 |
| | | | 285/322 |
| 2005/0062283 A1 * | 3/2005 | Hawkinson | E03B 3/03 |
| | | | 285/139.1 |
| 2005/0212291 A1 | 9/2005 | Edwards | |
| 2006/0022458 A1 * | 2/2006 | Droste | F16L 23/0283 |
| | | | 285/206 |
| 2006/0232066 A1 * | 10/2006 | Kanagae | F16L 21/035 |
| | | | 285/348 |
| 2008/0093844 A1 * | 4/2008 | Casey, Sr. | F16L 23/22 |
| | | | 285/135.2 |
| 2009/0058015 A1 * | 3/2009 | Laule | B60K 15/077 |
| | | | 277/591 |
| 2009/0179388 A1 * | 7/2009 | Uhlenkamp | F16L 23/22 |
| | | | 277/612 |
| 2011/0278835 A1 * | 11/2011 | Kishi | F16L 21/02 |
| | | | 285/348 |
| 2013/0139905 A1 * | 6/2013 | Lingvall | F16L 55/1108 |
| | | | 137/315.01 |
| 2014/0035282 A1 * | 2/2014 | Kishi | F16L 27/1275 |
| | | | 285/374 |
| 2014/0203554 A1 * | 7/2014 | Kishi | F16L 37/088 |
| | | | 285/374 |
| 2014/0375051 A1 | 12/2014 | Ikushima | |
| 2015/0041472 A1 * | 2/2015 | Smith | F16L 15/04 |
| | | | 220/288 |
| 2016/0102790 A1 * | 4/2016 | Kishi | F16L 21/04 |
| | | | 285/374 |
| 2016/0102792 A1 * | 4/2016 | Kishi | F16L 27/12751 |
| | | | 285/399 |
| 2017/0074429 A1 * | 3/2017 | Smith | F16L 15/08 |
| 2018/0231126 A1 | 8/2018 | Uhlenkamp et al. | |

* cited by examiner

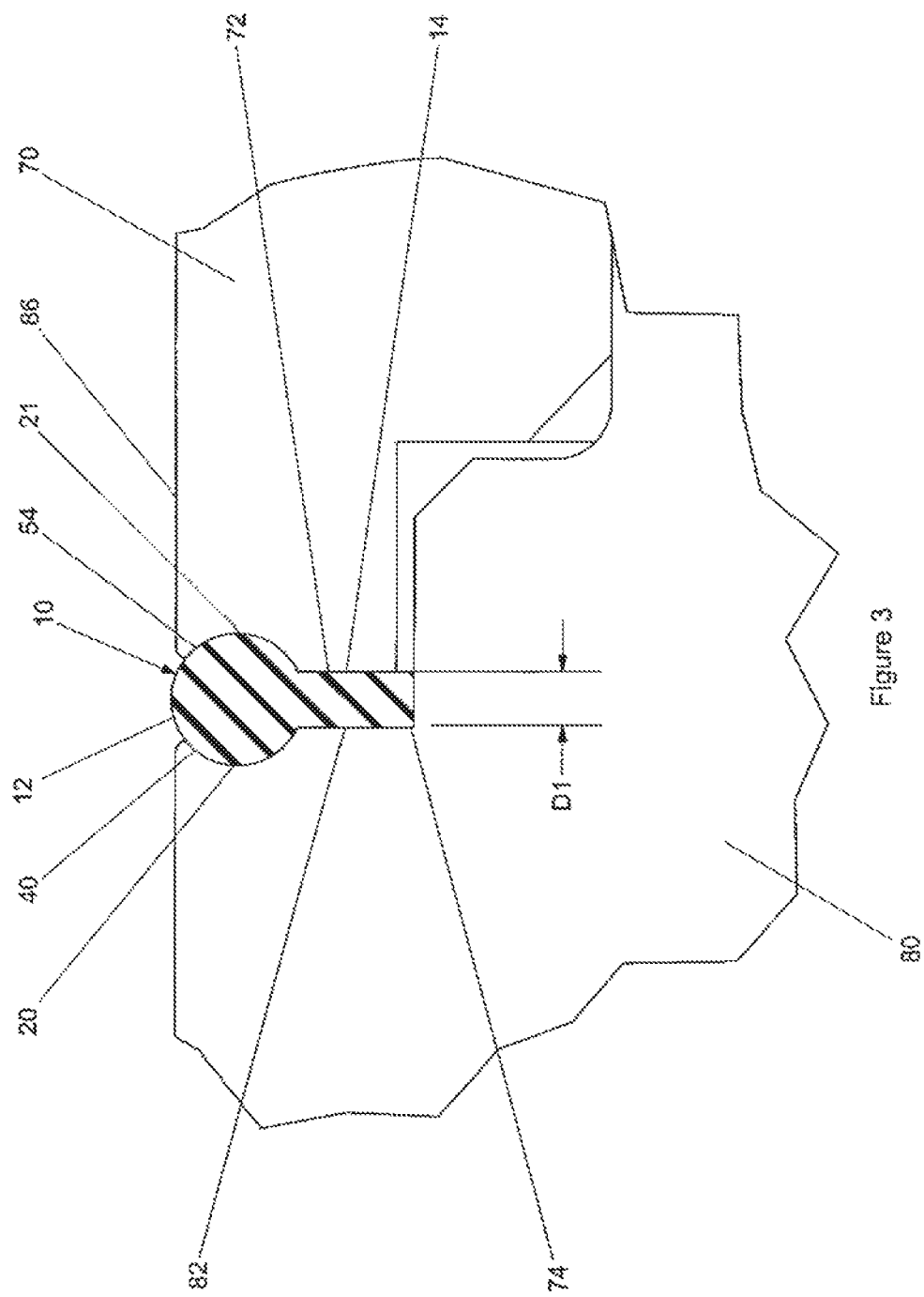

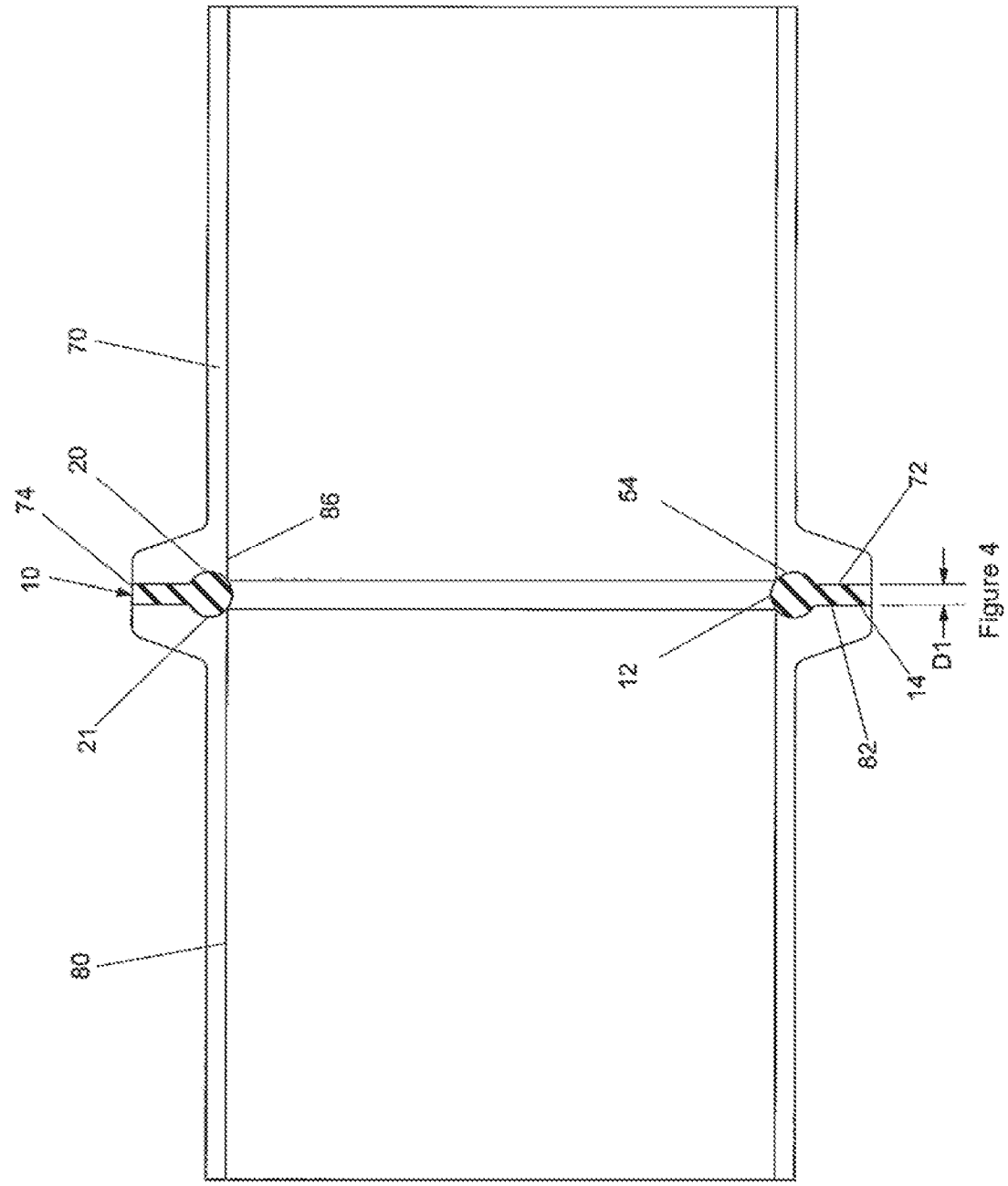

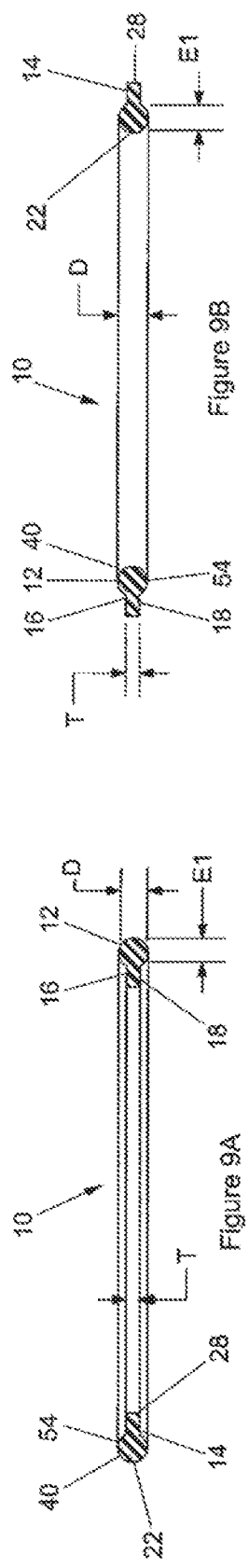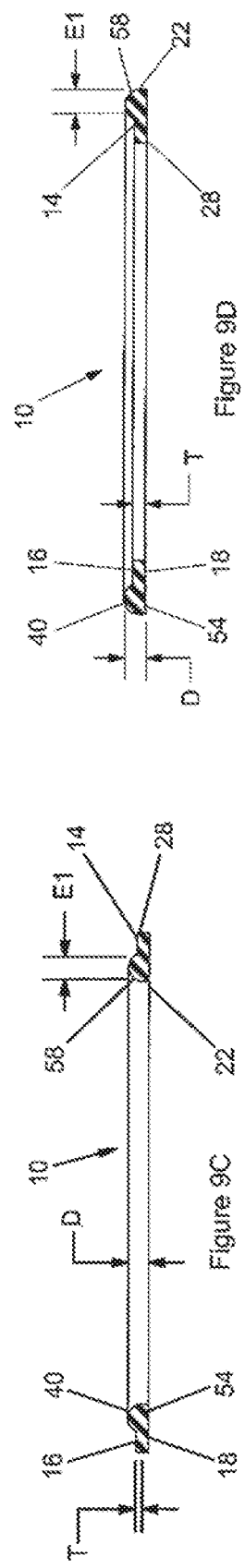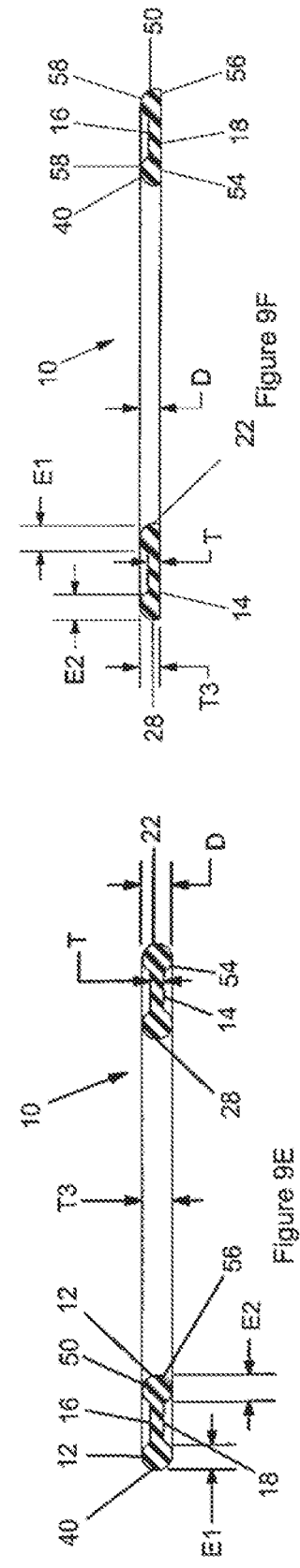
Figure 9

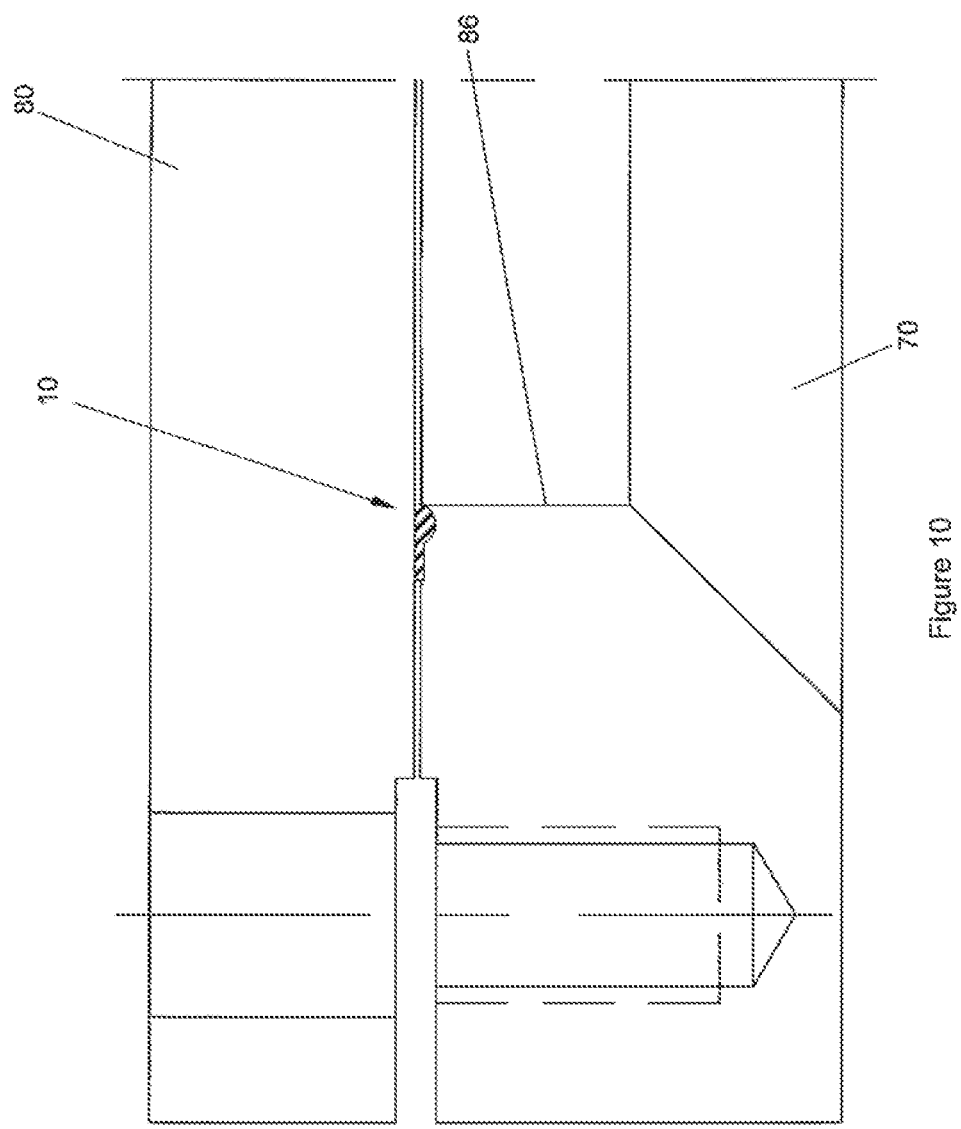

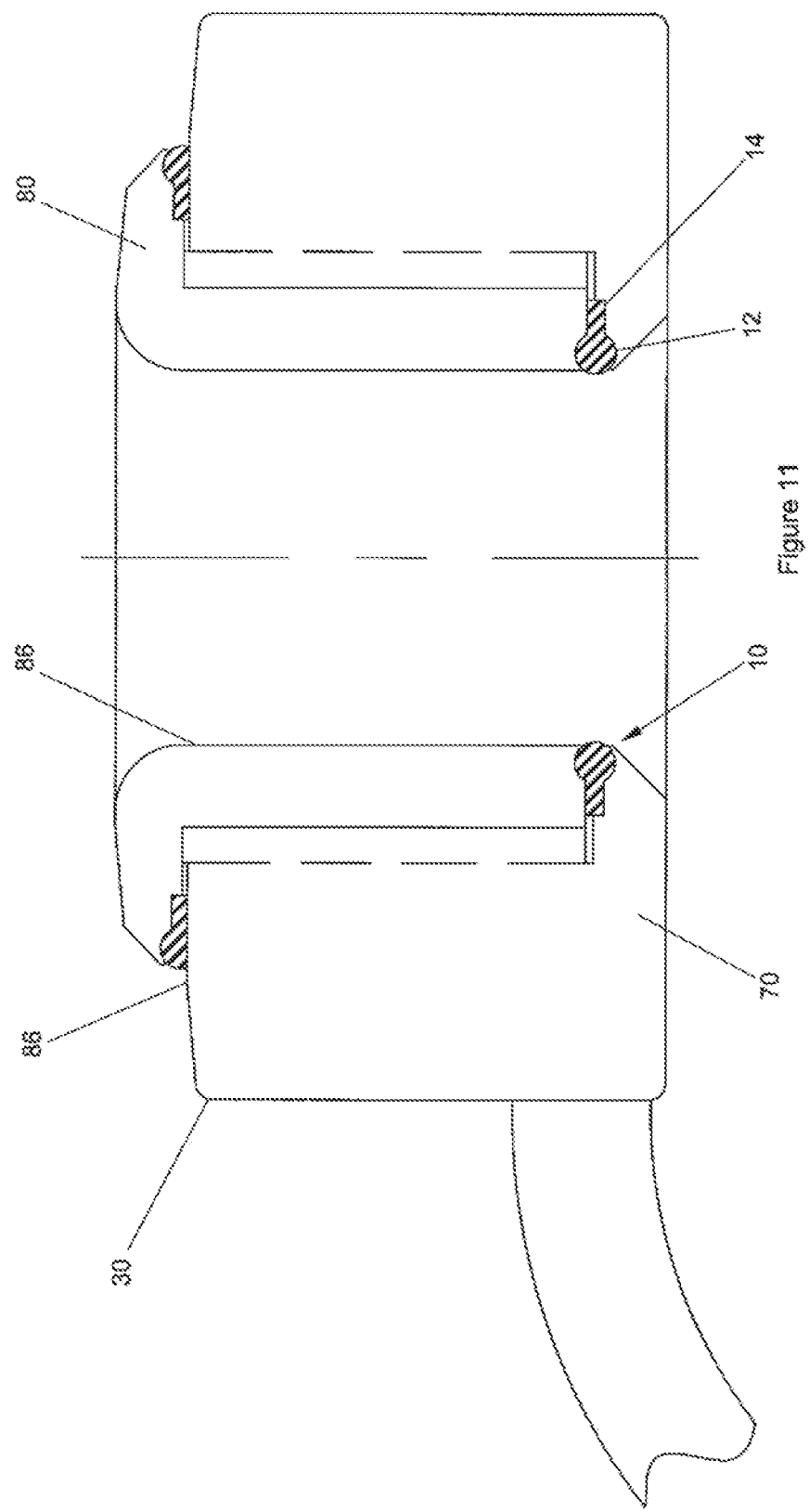

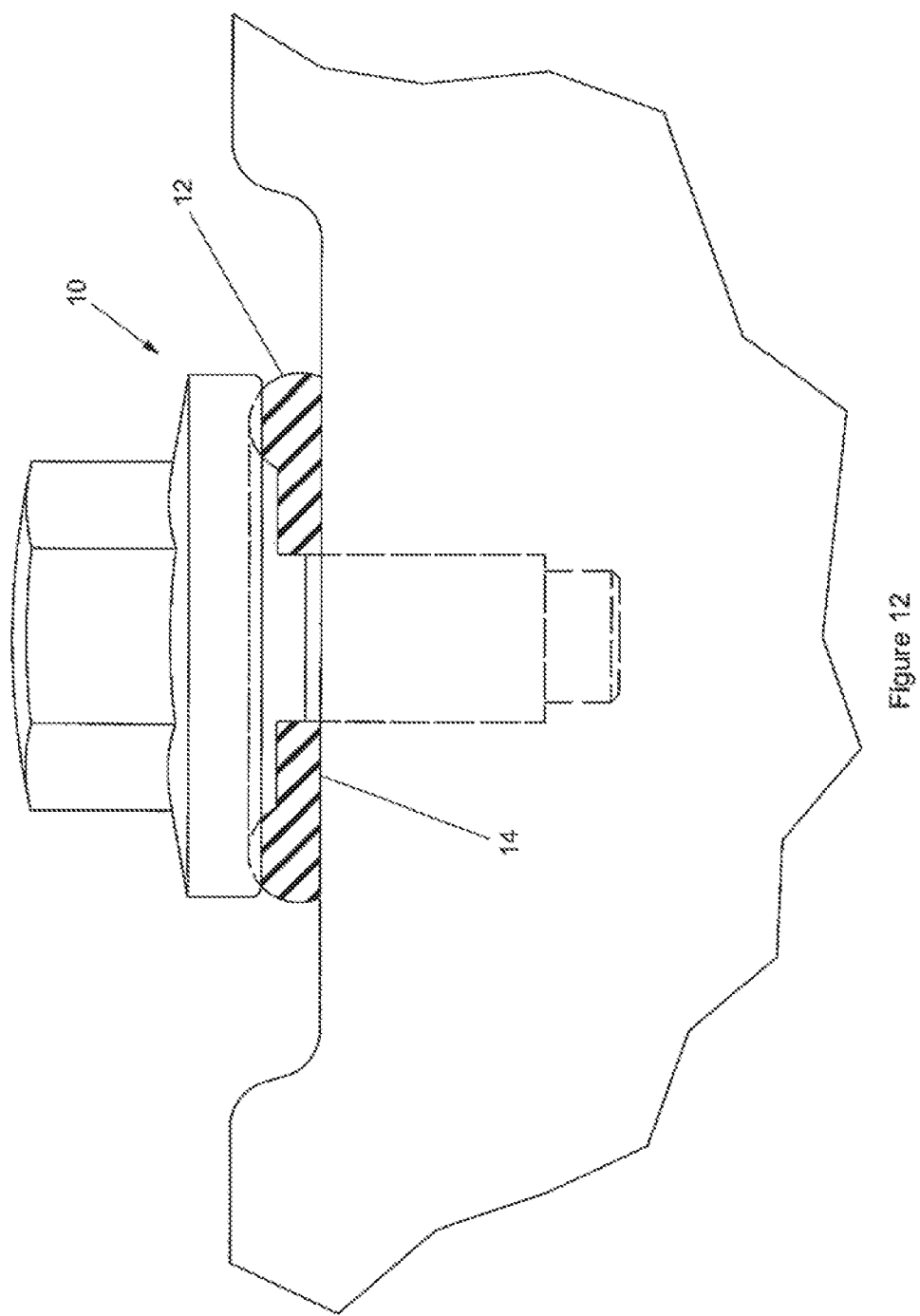

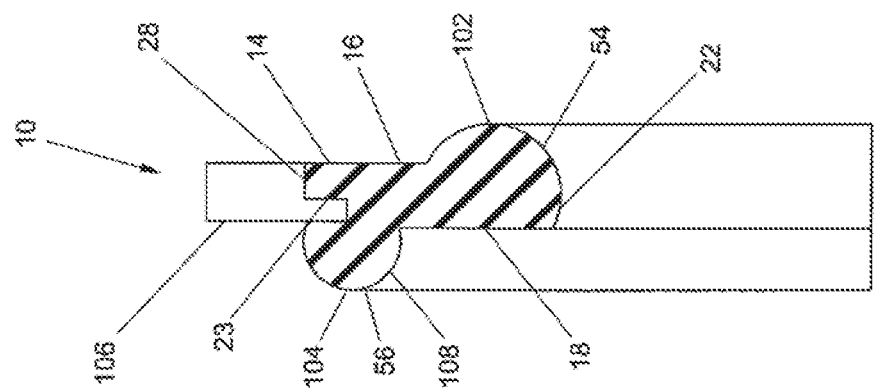
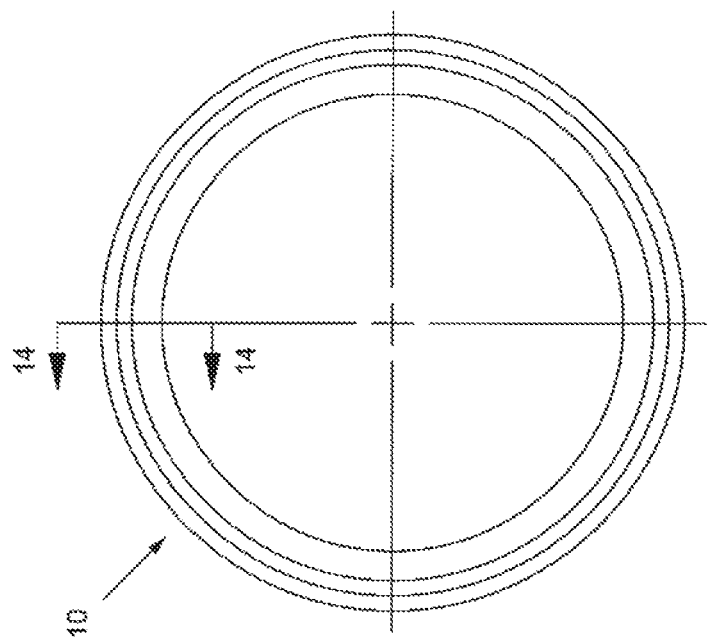

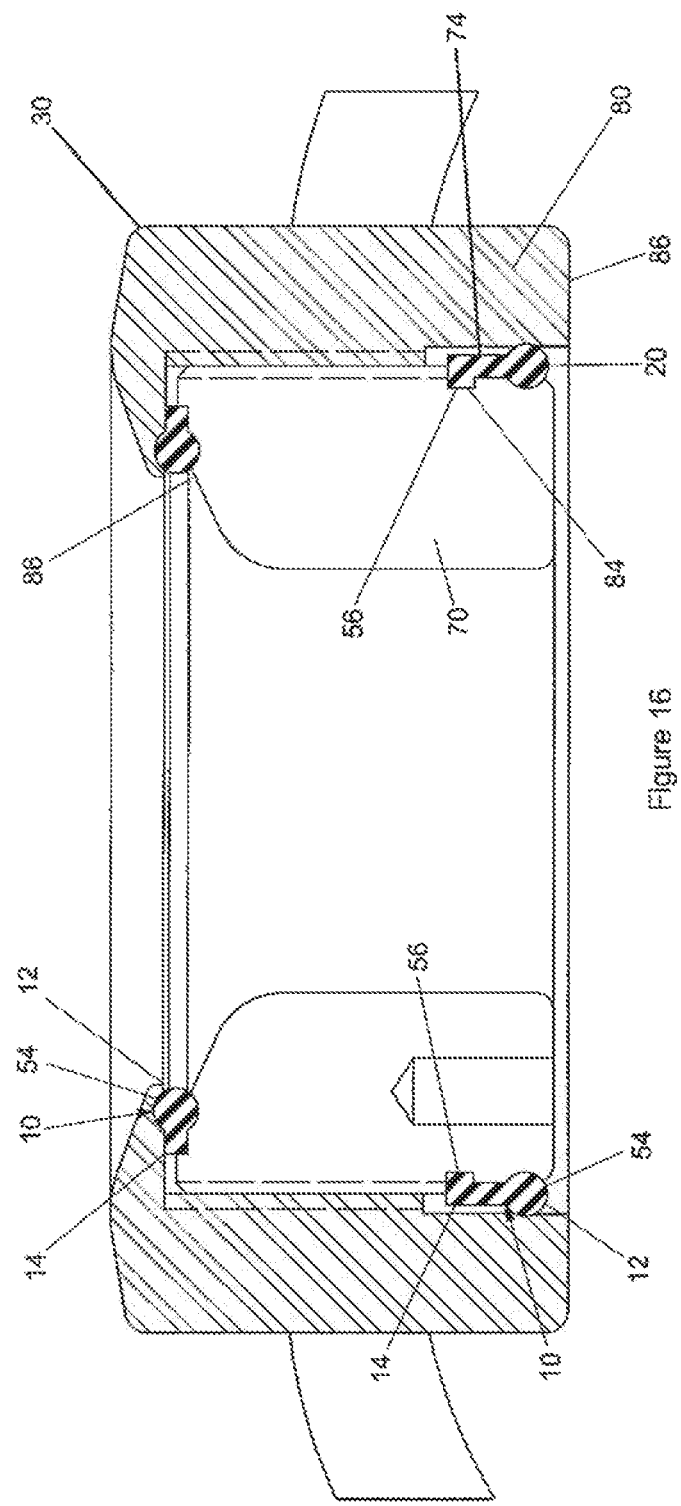

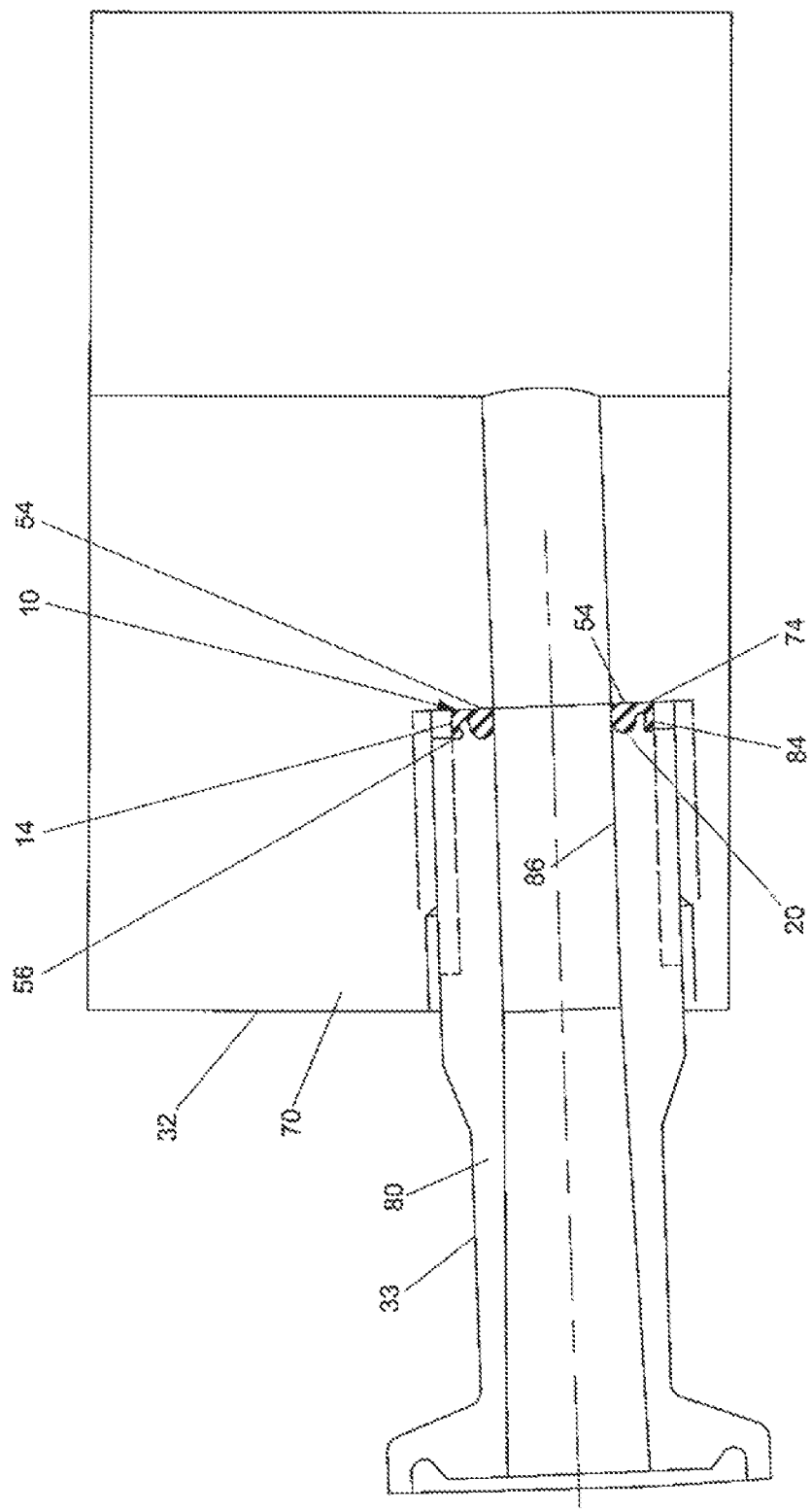

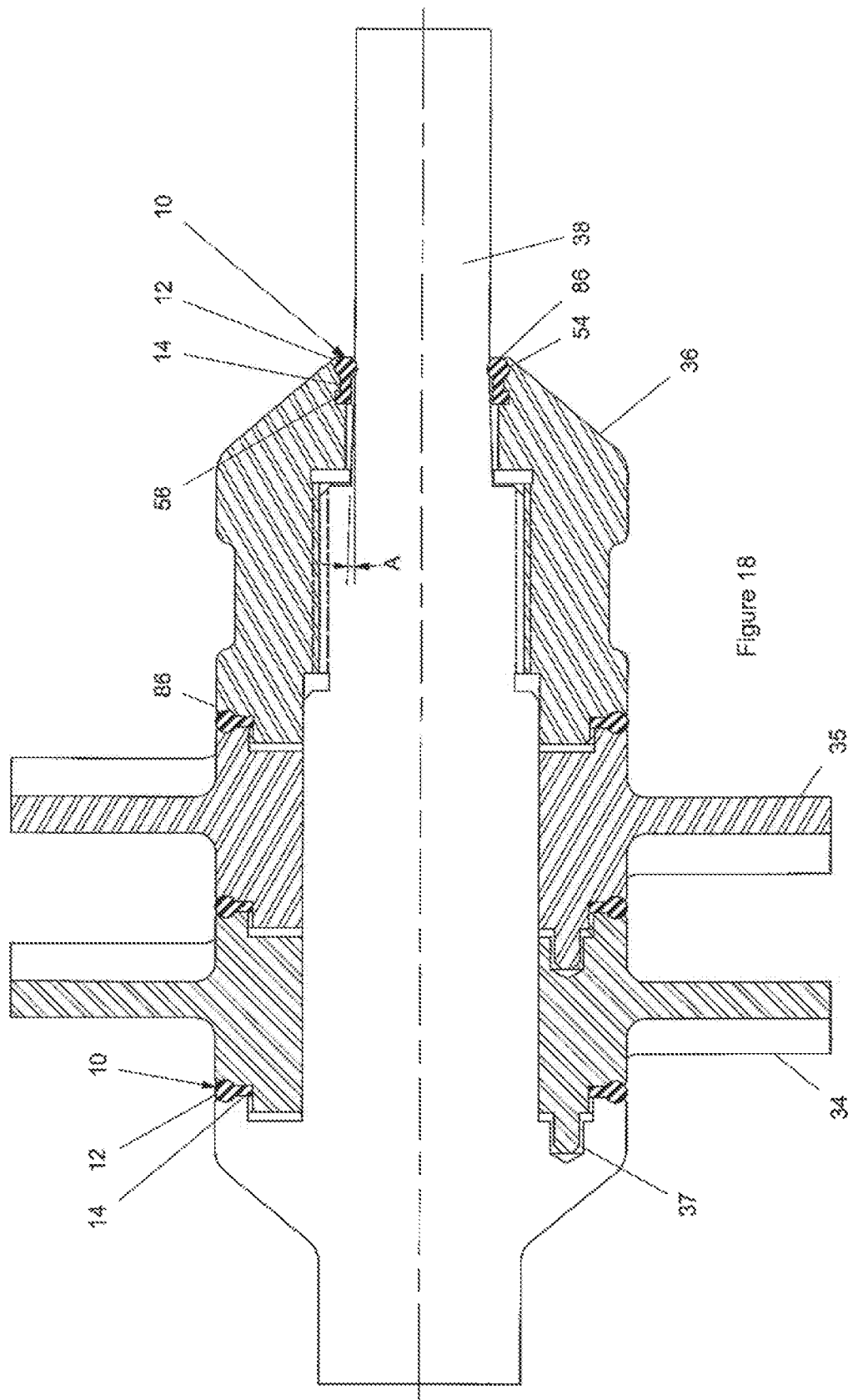

SANITARY FITTING CONNECTION

CROSS REFERENCE TO RELATED APPLICATION

The present application is a continuation patent application of U.S. patent application Ser. No. 15/952,639 filed Apr. 13, 2018, entitled "Seal Fitting Assembly," which is a divisional application of U.S. patent application Ser. No. 12/354,083 filed Jan. 15, 2009, entitled "Hygienic Coupling and Fitting Seal System", which claims benefit of U.S. Provisional Patent Application No. 61/021,272 filed on Jan. 15, 2008, entitled "Hygienic Coupling and Fitting Seal System," each of which are hereby incorporated herein in their entireties.

BACKGROUND OF THE INVENTION

The present invention relates to a seal system and, more particularly, to a hygienic coupling and fitting seal system for pharmaceutical, dairy, beverage, or other sanitary industries.

Various seals have been widely utilized in various industries. The seals utilized in plants or factories processing pharmaceutical, beverage, dairy products, or the like should be taken apart for periodic cleaning and should be made of a material capable of withstanding the processing. However, "binding", "rippling up", and "intrusion" commonly occurred on conventional seals, including but not limited to flat gaskets, O-rings, and other industry standard gaskets, creating potential for losing the sealing effect and for becoming a hygienic issue. For agitator couplings, conventional O-rings that are exposed and flush or slightly protrude do not always remain engaged and can actually lose the sealing effect and fall out.

Thus, a need exists for a hygienic coupling and fitting seal system that is easy to clean while providing reliable sealing effect.

BRIEF SUMMARY OF THE INVENTION

The present invention solves this need and other problems in the field of hygienic coupling and fitting seals by providing, in a preferred form, a seal system including a tail having an annular first surface and an annular second surface parallel to and spaced from the annular first surface in a first direction. The tail has a first thickness between the annular first and second surfaces in the first direction. The tail further includes first and second peripheral edges extending between and adjoining the annular first and second surfaces. The first and second peripheral edges are spaced from each other in a second direction perpendicular to the first direction. A first annular ring integrally extends from a portion of the tail for a first extent from the first peripheral edge towards but spaced from the second peripheral edge of the tail. The first annular ring and the portion of the tail form a seal. The seal includes an exterior including the first peripheral edge. The exterior of the seal has a second thickness parallel to the first thickness. The second thickness of the seal continuously increases and then continuously decreases from the first peripheral edge towards the second peripheral edge of the tail. The exterior of the seal is free of protrusions.

In preferred forms, the first annular ring integrally extends from the annular first surface, and the exterior of the seal includes the annular second surface for the first extent from the first peripheral edge towards but spaced from the second peripheral edge. The seal has generally semicircular cross sections in a plane including the first and second directions. In alternate preferred forms, the first annular ring integrally extends from the annular first and second surfaces, and the seal has generally circular cross sections in the plane including the first and second directions.

In a preferred form, a second annular ring integrally extends from another portion of the tail for a second extent from the second peripheral edge towards but spaced from the first peripheral edge. The second annular ring and the other portion of the tail form a seal element. The seal element includes an exterior including the second peripheral edge. The exterior of the seal element has a third thickness parallel to the first thickness. The third thickness of the seal element continuously increases and then continuously decreases from the second peripheral edge towards the first peripheral edge. The exterior of the seal element is free of protrusions.

In preferred forms, the annular first and second surfaces are L-shaped and include first and second sections extending generally perpendicularly to each other. The first thickness of the first section is perpendicular to the first thickness of the second section.

In one example, a seal for sealing a connection between a first fitting and a second fitting is disclosed. The seal includes a seal element having a convexly curved outer surface forming an outermost perimeter of the seal and a tail extending radially inwards from the interior surface of the seal element. The tail being substantially planar, such as having a rectangular cross-section, and having an interior surface forming an interior perimeter of the seal, where the interior perimeter of the seal defines a passageway through the seal.

In one example, a fitting assembly including a first fitting, a second fitting, and a seal positioned between the two fittings is disclosed. The first fitting includes a first product contacting sidewall and a first sealing face and the second fitting is coupled to the first fitting and includes a second product contacting sidewall and a second sealing face. The seal is positioned between the first and second sealing faces and includes a radially curved outer surface forming an exterior edge of the seal and a tail extending radially inwards from the radially curved outer surface, where the tail forms an interior edge of the seal that defines an opening through the seal. Once connected together, the first product contacting sidewall is substantially coplanar with the second product contacting sidewall and the seal seals a connection gap between the first sealing face and the second sealing face.

In yet another example, a seal for sealing a coupling location between two coupling members is disclosed. The seal includes an exterior portion formed in a ring and having a circular shaped cross-section and an interior portion extending radially inwards from the exterior portion where an interior edge of the interior portion defines an interior perimeter of the seal and a passage therethrough.

In another example, a hygienic fitting assembly is disclosed. The hygienic fitting assembly includes a first fitting member defining an exterior opening, an interior opening, and a passage extending therebetween. The passage has a first portion at the exterior opening and a second portion at the interior opening. The hygienic fitting assembly further includes a second fitting member receivable into the first portion of the passage and defining a duct configured for alignment with the second portion of the passage. The first and second fitting members are configured for removable mechanical attachment with one another along an interface region within the passage. The hygienic fitting assembly further includes a seal formed from a compression controlled and self-lubricating material and configured to receive an annular feature of one of the first or second fitting members and define sanitary fitting connection therebetween. The sanitary fitting connection is operable to prevent fluid escape toward the interface region during flow of a product from the duct and into the second portion of the passage.

In another example, the seal can include a peripheral edge positionable between the first and second fitting members and defining an annular boundary between the duct and the second portion of the passage. The annular boundary can define a seal between the product and the interface region of the first and second fitting members. The first and second fitting members can be removably attachable via a threaded connection. In some cases, the first fitting member can be defined by one or more features of a tank, with the tank defining the passage. Further, the second fitting member can be defined by one or more features of a tube, with the tube defining the duct.

In another example, the peripheral edge can be a first peripheral edge. In this regard, the seal can include a second peripheral edge that extends annularly about the duct. The annular feature can be defined by a terminal end of the second fitting. The seal can be configured to seat the terminal end between the first and second peripheral edges. In some cases, the first peripheral edge can be defined, in part, by a flat surface that extends annularly about the duct. As such, the flat surface can be mountable on the first fitting member, when the second fitting member is received by the seal and removably mechanically attached with the first fitting member.

In another example, the seal can further include a first section extending from the first peripheral edge and defining a first flat surface of the seal. The seal can further include a second section extending from the second peripheral edge and defining a second flat surface of the seal. The first and second flat surfaces can be perpendicular surfaces of the seal.

In another example, the first and second fitting members can cooperate to define an L-shaped annular gap within the passage. The seal can be seated within the L-shaped annular gap. Further, the seal can include an L-shaped tail that is received within the L-shaped annular gap. In some cases, the L-shaped annular gap can include a first L-shaped annular gap portion and a second L-shaped annular gap portion. The first and second L-shaped annular gap portions can extend generally perpendicular to one another. Further, the seal can include a first peripheral edge and a second peripheral edge, where each of the first and second peripheral edges are defined, in part, by a circular cross-section. The circular cross-section of each of the first and second peripheral edges can be adapted for seating in a corresponding one of the first L-shaped annular gap portion and a second L-shaped annular gap portion.

In another example, the seal can include a pair of annular rings concentrically spaced relative to a longitudinal axis of the passage when the seal defines the sanitary fitting connection. The pair of annular rings can include an outer ring and an inner ring. The inner ring can have a size greater than a size of the outer ring. The outer ring can be seated along an exterior annular surface of the first fitting member and defines a retaining lip therewith.

In another example, the first fitting member and the second fitting member can be configured to transition between a tightened and untightened position. The pair of annular rings can be configured to center the first fitting member within the passage during the transition. Further, the first and second fitting members can cooperate to prevent a shape of the seal from changing when the first fitting member and the second fitting member transition between an untightened position and a tightened position when removably mechanically attached to one another. In some cases, the first and second fitting members can be arranged to reduce a compression force on the seal when the seal defines a sanitary fitting connection between the first and second fitting members.

In another example, a hygienic fitting assembly is disclosed. The hygienic fitting assembly includes a housing defining an exterior opening, an interior opening, and a passage extending therebetween. The hygienic fitting assembly further includes a bolt receivable by the passage. The housing and the bolt are configured for removable mechanical attachment with one another along an interface region within the passage. The hygienic fitting assembly further includes a seal configured to receive the bolt and define sanitary fitting connection between the housing and the bolt. The seal is formed from a compression controlled and self-lubricating material. The seal defines an O-ring portion extending about an annular outermost surface of the seal. The seal further defines a tail portion connected to the O-ring portion and extending about an annular innermost surface of the seal. The O-ring portion and the tail portion cooperate to define a flat surface of the seal for seating on a face of the first fitting member. The O-ring portion is at least partially defined by a circular cross-section opposite the flat surface for seating on a face of the second fitting member.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where:

FIG. 3 shows a partial, cross sectional view of the seal system of FIG. 1 in use as a hygienic coupling.

FIG. 4 shows a cross sectional view illustrating use of a seal system of FIG. 9B in a standard fitting.

FIG. 9A-9F show cross sectional views of various embodiments of the hygienic coupling and fitting seal system according to the preferred teachings of the present invention.

FIG. 10 shows a cross sectional view illustrating use of the seal system of FIG. 9C in a flange seal.

FIG. 11 shows a cross sectional view illustrating use of the seal system of FIG. 9A and the seal system of FIG. 9D in an agitator bottom bearing seal in a mount.

FIG. 12 shows a cross sectional view illustrating use of the seal system of FIG. 9D in a bolt application.

FIG. 13 shows a plan view of a further embodiment of the seal system according to the preferred teachings of the present invention allowing mating with conventional seal systems.

FIG. 14 shows a cross sectional view of the seal system of FIG. 13 according to section line 14-14 of FIG. 13.

FIG. 16 shows a cross sectional view illustrating use of the seal system of FIG. 9B and the seal system of FIG. 15A in an agitator bottom bearing seal in a mount.

FIG. 17 shows a cross sectional view illustrating use of the seal system of FIG. 15K in a sanitary fitting connection between a blind threaded port or tank fitting and a screwed pipe/tube fitting.

FIG. 18 shows a cross sectional view illustrating use of the seal system of FIG. 9A and the seal system of FIG. 15B in a stacked hub assembly for an agitator shaft with removable hub and blade assemblies and retaining nut with torque alignment pins.

Figure 2:
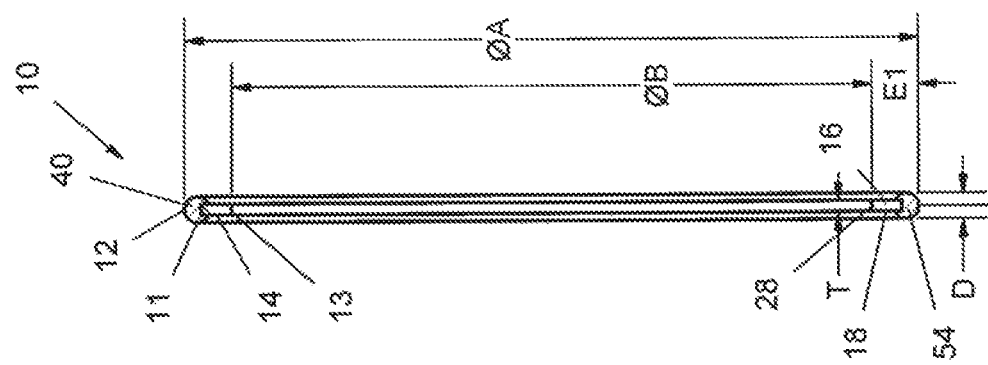
FIG. 2 shows a cross sectional view of the seal system of FIG. 1 according to section line 2-2 of FIG. 1.
Figure 1:
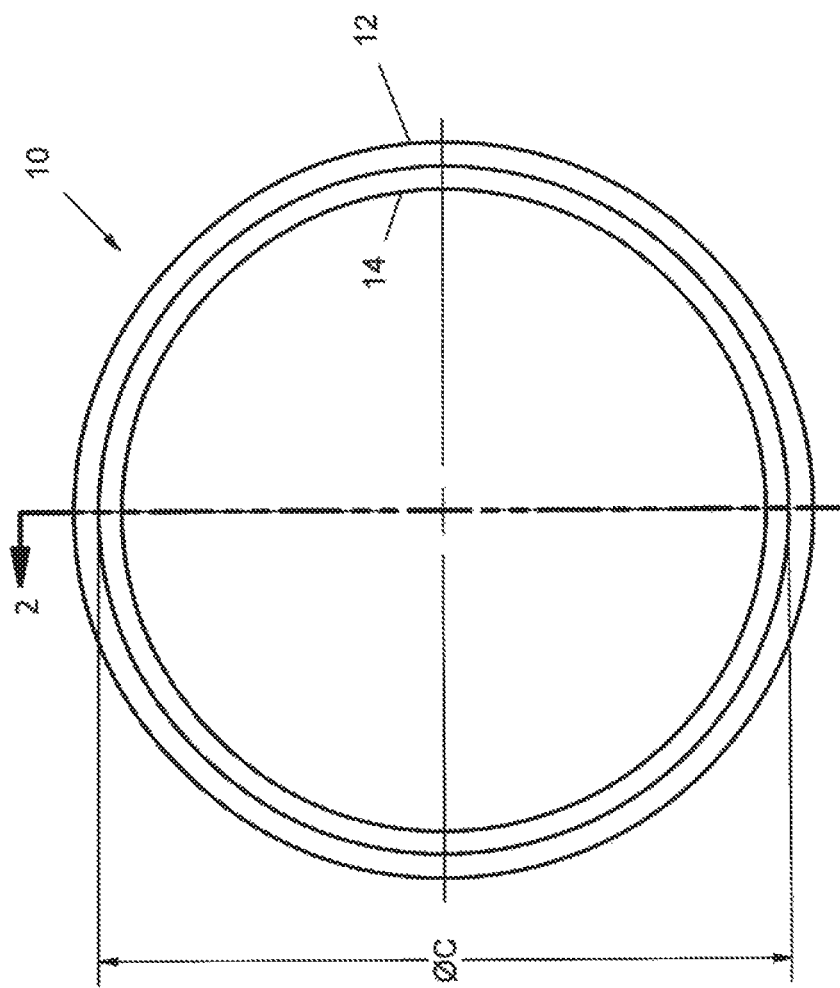
FIG. 1 shows a plan view of a hygienic coupling and fitting seal system according to the preferred teachings of the present invention.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "third", "upper", "lower", "inner", "outer", "end", "portion", "section", "axial", "radial", "circumferential", "annular", "spacing", "length", "thickness", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

A hygienic coupling and fitting seal system according to the preferred teachings of the present invention is shown in the drawings and generally designated 10. According to the teachings of the present invention, seal system 10 includes a tail 14 having an annular first surface 16 and an annular second surface 18 which in the preferred forms shown is parallel to and spaced from annular first surface 16 in a first direction. Tail 14 has a first thickness T between annular first and second surfaces 16 and 18 in the first direction. Tail 14 further includes first and second peripheral edges 22 and 28 extending between and adjoining annular first and second surfaces 16 and 18. First and second peripheral edges 22 and 28 are spaced from each other in a second direction perpendicular to the first direction. In the preferred forms shown, tail 14 has generally rectangular cross sections in a plane including the first and second directions.

According to the teachings of the present invention, a first annular ring 40 integrally extends from a portion of tail 14 for a first extent E1 from first peripheral edge 22 towards but spaced from second peripheral edge 28 of tail 14. First annular ring 40 and the portion of tail 14 form a seal 54 having an exterior including first peripheral edge 22. The exterior of seal 54 has a second thickness D parallel to first thickness T. Second thickness D of seal 54 continuously increases and then continuously decreases from first peripheral edge 22 towards second peripheral edge 28 of tail 14. In a preferred embodiment shown in FIG. 2, seal system 10 is formed of two components 11 and 13. Component 11 includes the exterior of seal 54 and a groove receiving component 13. Tail 14 is formed of component 13 and a portion of component 11 aligned with component 13 in the second direction.

In a preferred form shown in FIGS. 2 and 9A, annular first and second surfaces 16 and 18 extend in a radial direction and are spaced in an axial direction perpendicular to the radial direction. Furthermore, first peripheral edge 22 is an outer peripheral edge of tail 14, and second peripheral edge 28 is an inner peripheral edge of tail 14 spaced from the outer peripheral edge in the second direction which is the radial direction, with the inner peripheral edge radially inward of the outer peripheral edge. First annular ring 40 integrally extends from annular first and second surfaces 16 and 18. Furthermore, in the form shown, seal 54 has generally circular cross sections in the plane including the first and second directions and is in the form of an O-ring 12, with first extent E1 equal to the maximum second thickness D.

In a preferred form shown in FIG. 9B, annular first and second surfaces 16 and 18 extend in a radial direction and are spaced in an axial direction perpendicular to the radial direction. Furthermore, first peripheral edge 22 is the inner peripheral edge of tail 14, and second peripheral edge 28 is the outer peripheral edge of tail 14 spaced from the inner peripheral edge in the second direction which is the radial direction, with the inner peripheral edge radially inward of the outer peripheral edge. First annular ring 40 integrally extends from annular first and second surfaces 16 and 18. Furthermore, in the form shown, seal 54 has generally circular cross sections in the plane including the first and second directions and is in the form of an O-ring 12, with first extent E1 equal to the maximum second thickness D.

In a preferred form shown in FIG. 9C, annular first and second surfaces 16 and 18 extend in a radial direction and are spaced in an axial direction perpendicular to the radial direction. Furthermore, first peripheral edge 22 is the inner peripheral edge of tail 14, and second peripheral edge 28 is the outer peripheral edge of tail 14 spaced from the inner peripheral edge in the second direction which is the radial direction, with the inner peripheral edge radially inward of the outer peripheral edge. First annular ring 40 integrally extends from annular first surface 16, and the exterior of seal 54 includes annular second surface 18 for first extent E1 from first peripheral edge 22 of tail 14 towards but spaced from second peripheral edge 28 of tail 14. Furthermore, in the form shown, seal 54 has generally semicircular cross sections 58 in the plane including the first and second directions.

In a preferred form shown in FIG. 9D, annular first and second surfaces 16 and 18 extend in a radial direction and are spaced in an axial direction perpendicular to the radial direction. Furthermore, first peripheral edge 22 is the outer peripheral edge of tail 14, and second peripheral edge 28 is the inner peripheral edge of tail 14 spaced from the outer peripheral edge in the second direction which is the radial direction, with the inner peripheral edge radially inward of the outer peripheral edge. First annular ring 40 integrally extends from annular first surface 16, and the exterior of seal 54 includes annular second surface 18 for first extent E1 from first peripheral edge 22 of tail 14 towards but spaced from second peripheral edge 28 of tail 14. Furthermore, in the form shown, seal 54 has generally semicircular cross sections 58 in the plane including the first and second directions.

According to further preferred forms according to the teachings of the present invention, a second annular ring 50 integrally extends from the other portion of tail 14 for a second extent E2 from second peripheral edge 28 towards but spaced from first peripheral edge 22. Second annular ring 50 and the other portion of tail 14 form a seal element 56 having an exterior including second peripheral edge 28. The exterior of seal element 56 has a third thickness T3 parallel to first thickness T. Third thickness T3 of seal element 56 continuously increases and then continuously decreases from second peripheral edge 28 towards first peripheral edge 22.

In a preferred form shown in FIG. 9E, annular first and second surfaces 16 and 18 extend in a radial direction and are spaced in an axial direction perpendicular to the radial direction. Furthermore, first annular ring 40 integrally extends from annular first and second surfaces 16 and 18. Second annular ring 50 integrally extends from annular first and second surfaces 16 and 18. Furthermore, each of seal 54 and seal element 56 has generally circular cross sections in the plane including the first and second directions and in the form of an O-ring 12. Further, in the form shown, seal element 56 is of a size substantially equal to seal 54, and the maximum third thickness T3 is equal to first extent E1, second extent E2, and the maximum second thickness D and larger than first thickness T of tail 14.

In a preferred form shown in FIG. 9F, annular first and second surfaces 16 and 18 extend in a radial direction and are spaced in an axial direction perpendicular to the radial direction. Furthermore, first annular ring 40 integrally extends from annular first surface 16, and the exterior of seal 54 includes annular second surface 18 for first extent E1 from first peripheral edge 22 of tail 14 towards but spaced from second peripheral edge 28 of tail 14. Second annular ring 50 integrally extends from annular first surface 16, and the exterior of seal element 56 includes annular second surface 18 for second extent E2 from second peripheral edge 28 of tail 14 towards but spaced from first peripheral edge 22 of tail 14. Furthermore, in the form shown, each of seal 54 and seal element 56 has generally semicircular cross sections 58 in the plane including the first and second directions. Furthermore, seal element 56 is of a size equal to seal 54, and the maximum 10 third thickness T3 is equal to the maximum second thickness D which is larger than first thickness T of tail 14.

In preferred forms shown in FIGS. 15A-15D, first annular ring 40 integrally extends from annular first and second surfaces 16 and 18, and the exterior of seal element 56 includes one of annular first and second surfaces 16 and 18 for second extent E2, with seal element 56 being of a size smaller than seal 54. Specifically, in the forms shown, seal 54 has generally circular cross sections in the plane including the first and second directions, with first extent E1 of seal 54 generally more than two times of second extent E2 of seal element 56. Particularly, in the preferred form shown in FIG. 15A, annular first and second surfaces 16 and 18 extend in an axial direction and are spaced in a radial direction perpendicular to the axial direction. Furthermore, tail 14 is in the form of a hollow cylinder, and second annular ring 50 integrally extends from annular second surface 18 that is an inner cylindrical surface of the hollow cylinder. Furthermore, seal 54 and seal element 56 are spaced in the second direction which is the axial direction. In the preferred form shown in FIG. 15B, annular first and second surfaces 16 and 18 extend in an axial direction and are spaced in a radial direction perpendicular to the axial direction. Furthermore, tail 14 is in the form of a hollow cylinder, and second annular ring 50 integrally extends from annular first surface 16 that is an outer cylindrical surface of the hollow cylinder. Furthermore, seal 54 and seal element 56 are spaced in the second direction which is the axial direction. In the preferred form shown in FIG. 15C, annular first and second surfaces 16 and 18 extend in a radial direction and are spaced in an axial direction perpendicular to the radial direction. Furthermore, second annular ring 50 integrally extends from annular first surface 16, and seal 54 and seal element 56 are spaced in the second direction which is the radial direction, with seal 54 radially outward of seal element 56. In the preferred form shown in FIG. 15D, annular first and second surfaces 16 and 18 extend in a radial direction and are spaced in an axial direction perpendicular to the radial direction. Furthermore, second annular ring 50 integrally extends from annular first surface 16, and seal 54 and seal element 56 are spaced in the second direction which is the radial direction, with seal element 56 radially outward of seal 54.

In preferred forms shown in FIGS. 15E-15H, tail 14 is in the form of a hollow cylinder, first annular ring 40 integrally extends from annular first surface 16, and the exterior of seal 54 includes annular second surface 18 for first extent E1 from first peripheral edge 22 towards but spaced from second peripheral edge 28. Furthermore, the exterior of seal element 56 includes one of annular first and second surfaces 16 and 18 for second extent E2, with seal element 56 being of a size smaller than seal 54. Specifically, in the forms shown, seal 54 has generally semicircular cross sections 58 in the plane including the first and second directions, with first extent E1 of seal 54 generally more than two times of second extent E2 of seal element 56. Furthermore, annular first and second surfaces 16 and 18 are spaced in the first direction which is a radial direction, and first and second peripheral edges 22 and 28 are spaced in the second direction which is an axial direction perpendicular to the radial direction. Further, seal 54 and seal element 56 are spaced in the second direction which is the axial direction. Particularly, in the preferred form shown in FIG. 15E, both first and second annular rings 40 and 50 integrally extend from annular first surface 16 that is an outer cylindrical surface of the hollow cylinder. In the preferred form shown in FIG. 15F, first annular ring 40 integrally extend from annular first surface 16 that is an inner cylindrical surface of the hollow cylinder, and second annular ring 50 integrally extends from annular second surface 18 that is the outer cylindrical surface of the hollow cylinder. In the preferred form shown in FIG. 15Q both first and second annular rings 40 and 50 integrally extend from annular first surface 16 that is the inner cylindrical surface of the hollow cylinder. In the preferred form shown in FIG. 15H, first annular ring 40 integrally extends from annular first surface 16 that is the outer cylindrical surface of the hollow cylinder, and second annular ring 50 integrally extends from annular second surface 18 that is the inner cylindrical surface of the hollow cylinder.

In preferred forms shown in FIGS. 15I-15L, tail 14 is L-shaped. Specifically, annular first and second surfaces 16 and 18 are L-shaped and include first and second sections 62 and 64 extending generally perpendicular to each other. First thickness T of first section 62 is perpendicular to first thickness T of second section 64. Furthermore, second section 64 is in the form of a hollow cylinder, and first section 62 is in the form of a radially extending flange. First annular ring 40 integrally extends from annular first surface 16, and the exterior of seal 54 includes annular second surface 18 for first extent E1 from first peripheral edge 22 towards but spaced from second peripheral edge 28. Furthermore, the exterior of seal element 56 includes one of annular first and second surfaces 16 and 18 for second extent E2, with seal element 56 being of a size smaller than seal 54. Specifically, in the forms shown, seal 54 has generally semicircular cross sections 58 in the plane including the first and second directions, with first extent E1 of seal 54 generally more than two times of second extent E2 of seal element 56.

Figure 15A:
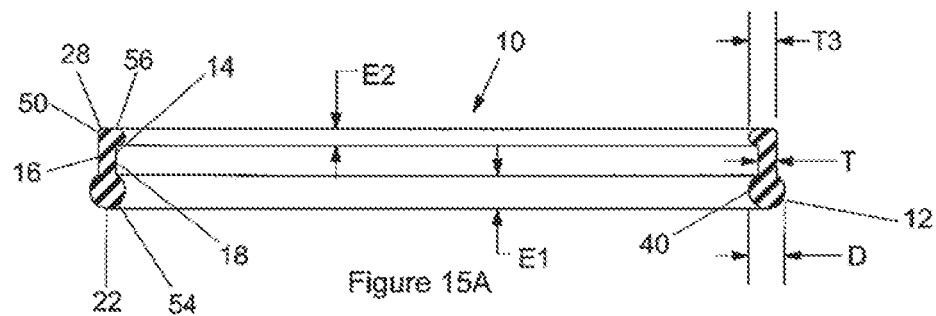
FIG. 15A-15L shows further embodiments of the seal system according to the preferred teachings of the present invention.
Figure 15B:
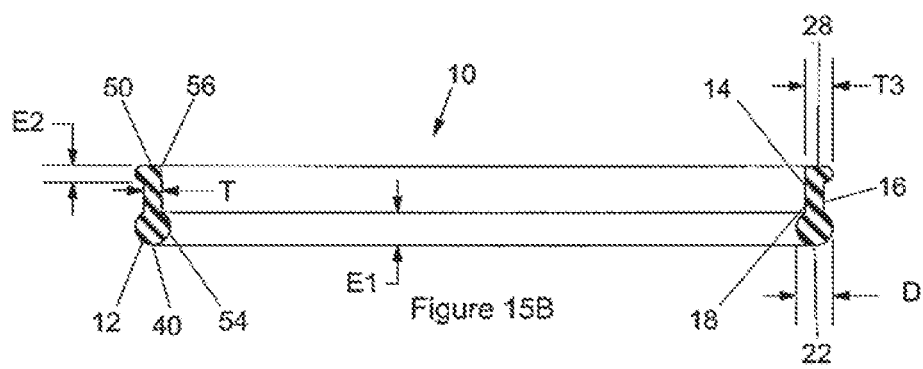
Figure 15C:
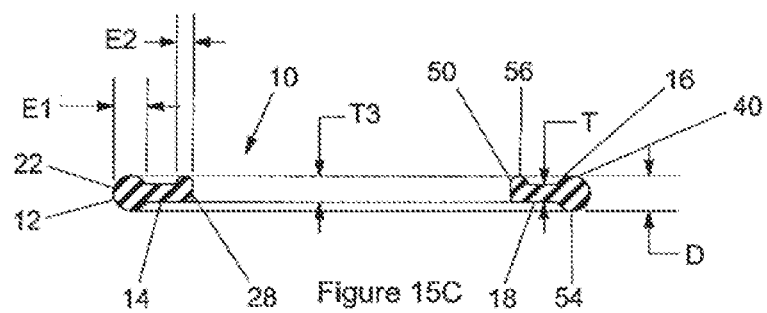
Figure 15D:
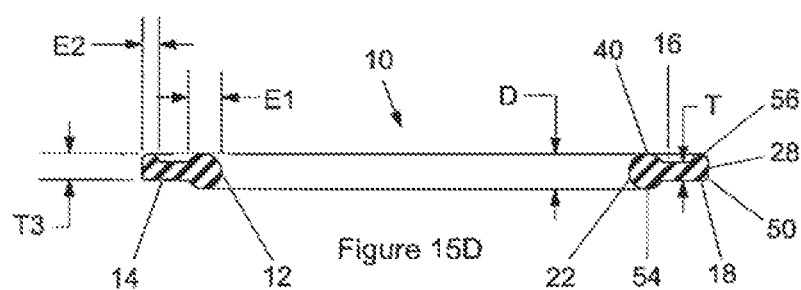
Figure 15E:
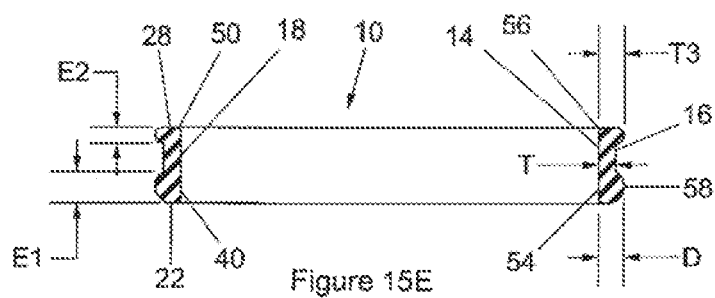
Figure 15F:
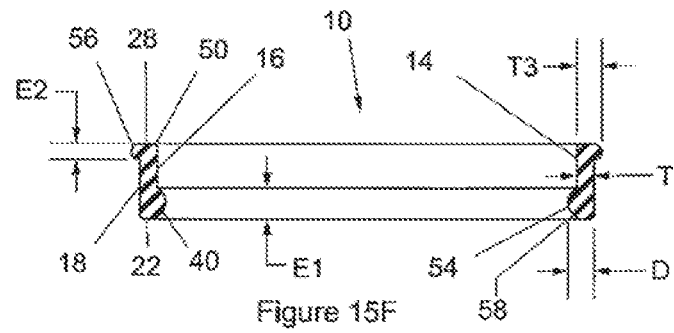
Figure 15G:
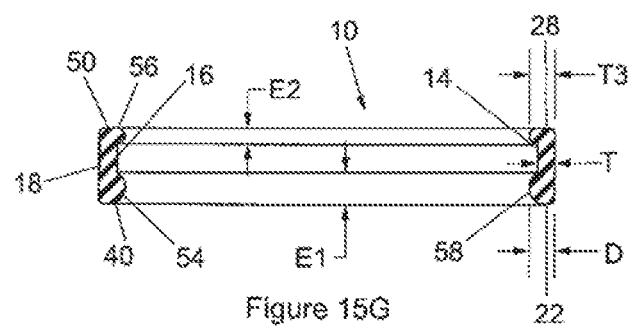
Figure 15H:
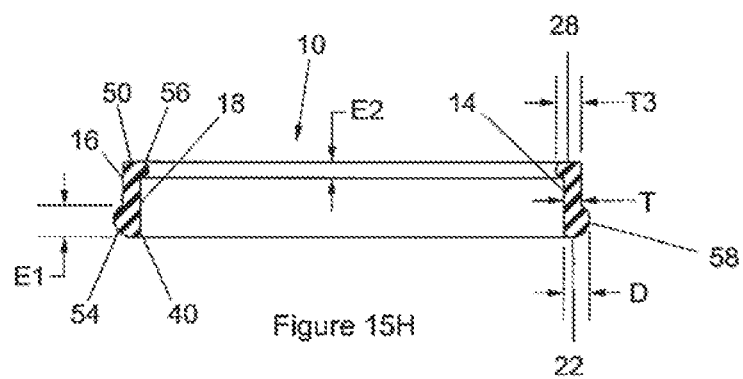
Figure 15I:
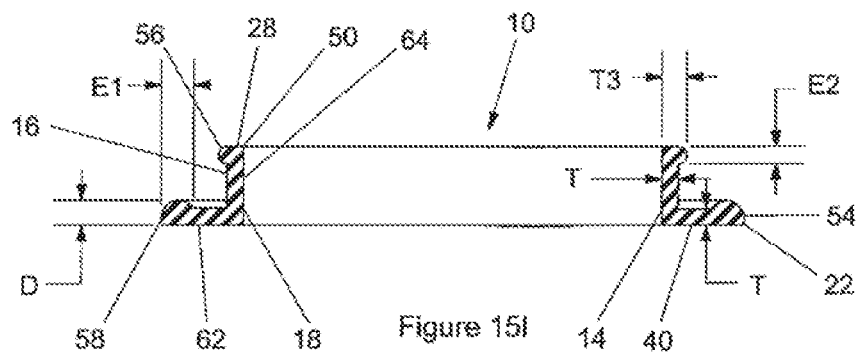
Figure 15J:
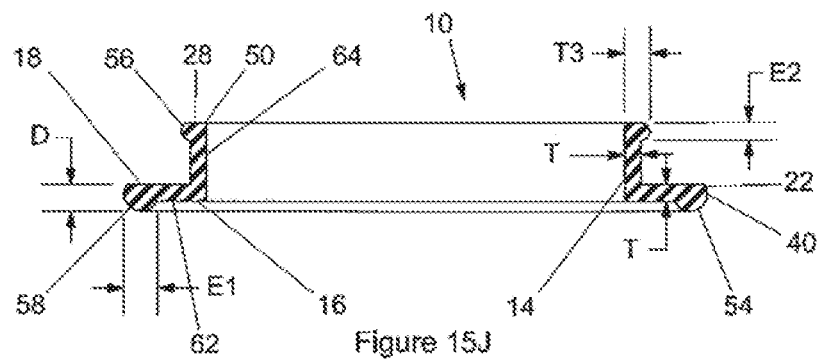

Particularly, in the preferred form shown in FIG. 15I, first annular ring 40 integrally extends from annular first surface 16 of first section 62 extending radially outwardly of second section 64, with annular first surface 16 of second section 64 being a radially outer surface of the hollow cylinder forming second section 64. Furthermore, second annular ring 50 integrally extends from annular first surface 16 of second section 64. In the preferred form shown in FIG. 15J, first annular ring 40 integrally extends from annular first surface 16 of first section 62 extending radially outwardly of second section 64, with annular first surface 16 of second section 64 being a radially inner surface of the hollow cylinder forming second section 64. Furthermore, second annular ring 50 integrally extends from annular second surface 18 of second section 64. In the preferred form shown in FIG. 15K, first annular ring 40 integrally extends from annular first surface 16 of first section 62 extending radially inward of second section 64, with annular first surface 16 of second section 64 being the radially inner surface of the hollow cylinder forming second section 64. Furthermore, second annular ring 50 integrally extends from annular first surface 16 of second section 64. In the preferred form shown in FIG. 15L, first annular ring 40 integrally extends from annular first surface 16 of first section 62 extending radially inward of second section 64, with annular first surface 16 of second section 64 being a radially outer surface of the hollow cylinder forming second section 64. Furthermore, second annular ring 50 integrally extends from annular second surface 18 of second section 64.

According to the teachings of the present invention, seal system 10 is formed from sealable/compression control type materials, where the compression, shape change, and deformation is limited. In some instances, the material may be substantially incompressible. In the most preferred form is TEFLON® based. However, other thermoplastics (TP) or thermoplastic elastomers (TPEs) type materials can be used.

In a preferred form shown in FIGS. 13 and 14, annular first and second surfaces 16 and 18 extend radially. Seal system 10 includes seal 54 in the most preferred form shown as a half O-ring 102 formed on annular first surface 16 of tail 14, seal element 56 in the most preferred form shown as a half O-ring 104 formed on annular second surface 18 of tail 14, and a tail extension 106. Seal 54 and seal element 56 are radially spaced from and oppose each other, with seal element 56 located radially outward of seal 54. Seal element 56 includes an annular groove 23 in second peripheral edge 28, and tail extension 106 includes a ledge 108 engaged in annular groove 23. Tail extension 106 may be separately formed and in the most preferred form of different materials than tail 14, seal 54, and seal element 56 such as of non-compressible material. Seal 54 is of a larger radius than seal element 56, with seal 54 having a radius of 0.70 inches (1.78 cm) and with seal element 56 having a radius of 0.46 inches (1.17 cm) in the most preferred form shown. Seal system 10 is advantageous in that one side of it can adopt a conventional seal installation. As an example, seal system 10 can mate with current industry seal systems. Other similar adaptations to existing seals can be made according to the teachings of the present invention.

Now that the basic construction of the seal systems 10 of the preferred teachings of the present invention has been explained, the operation and some of the advantages of seal systems 10 can be set forth and appreciated. In an application of seal systems 10 of FIGS. 1, 2, 9A, and 9B between first and second fitting members 70 and 80 shown in FIG. 3, seal system 10 is generally mounted between an end face 72 of first fitting 20 member 70 and an end face 82 of second fitting member 80 to form a sealing assembly. First and second fitting members 70 and 80 are mounted in an environment containing and/or allowing passage of a product such as a fluid and extend in the first direction. First and second fitting members 70 and 80 include a product contact side 86 in contact with the product. End face 72 of first fitting member 70 extends in the second direction 25 and includes an annular groove 20 adjoining product contact side 86. Annular groove 20 is of a size equal to a portion of first annular ring 40 extending from annular first surface 16 away from annular second surface 18. In the preferred forms shown, end face 82 of second fitting member 80 extends in the second direction and includes an annular groove 21 facing annular groove 20. Annular groove 21 has a size equal to another portion of first annular ring 40 extending from annular second surface 18 away from annular first surface 16. Annular groove 20 has a diameter which is the same as that of annular groove 21. An annular gap 74 is defined between end faces 72 and 82 and in communication with annular grooves 20 and 21. Annular gap 74 has a depth D1 in the first direction equal to first thickness T of tail 14. Seal 54 in the form of O-ring 12 is received in annular grooves 20 and 21 and adjacent product contact side 86, and tail 14 is received in annular gap 74. Thus, seal 54 is exposed on product contact side 86 between end faces 72 and 82 generally equal to depth D1.

Figure 5:
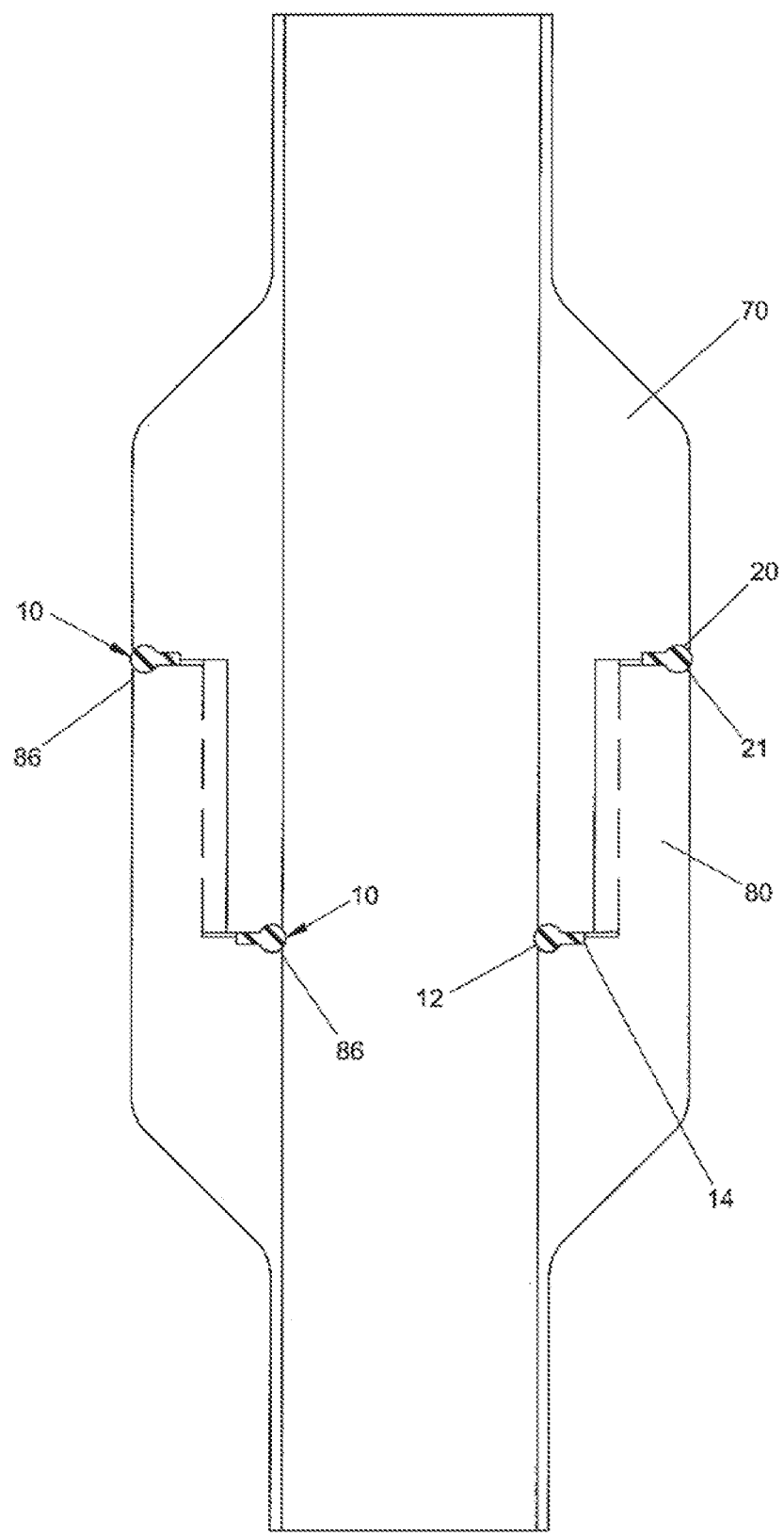
FIG. 5 shows a cross sectional view illustrating use of the seal system of FIG. 9A and the seal system of FIG. 9B in a tube or pipe coupling.
Figure 6:
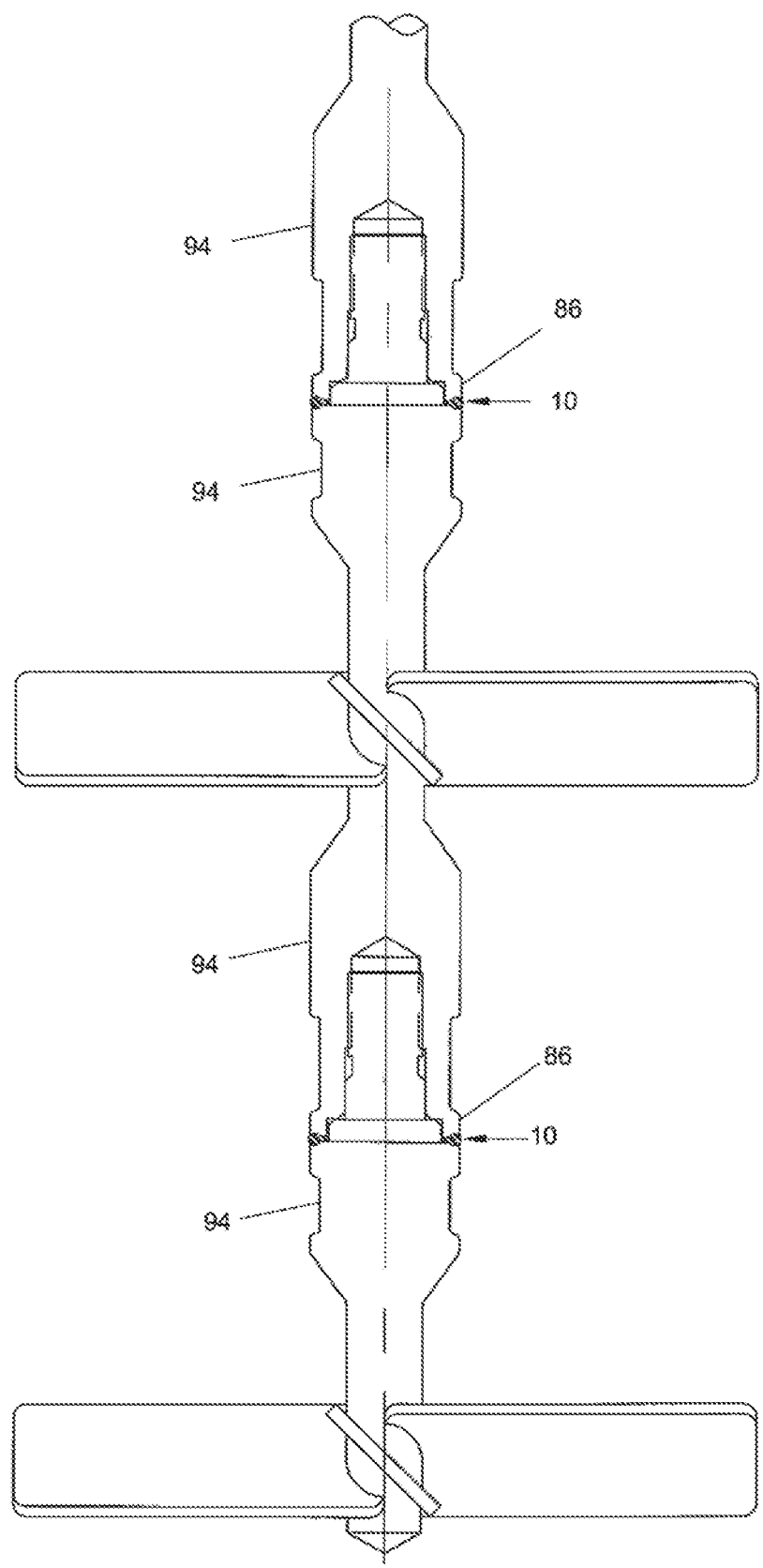
FIG. 6 shows a cross sectional view illustrating use of the seal system of FIG. 9A in a multiple impeller shaft coupling assembly.
Figure 7:
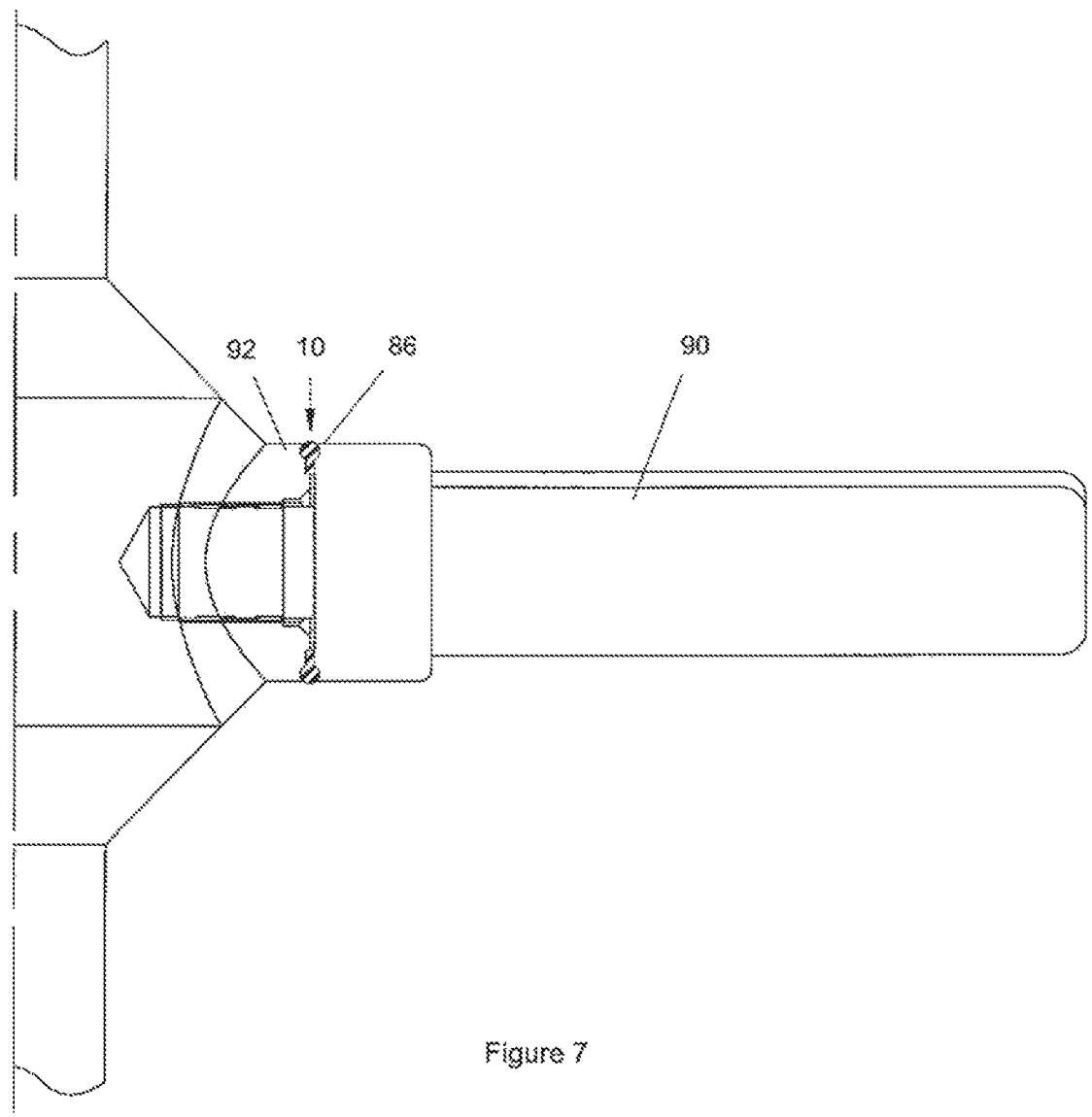
FIG. 7 shows a cross sectional view illustrating use of the seal system of FIG. 9A in a removable agitator blade design.
Figure 8:
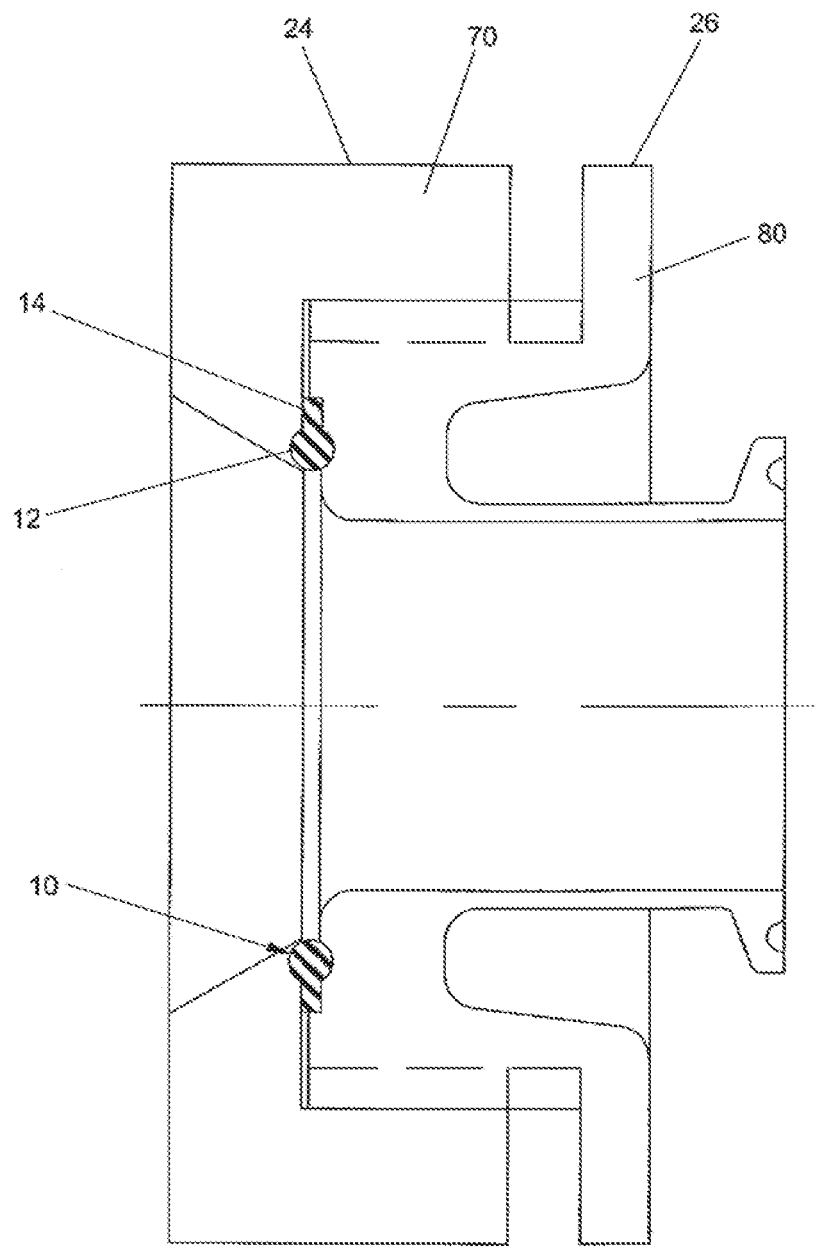
FIG. 8 shows a cross sectional view illustrating use of the seal system of FIG. 9B in a sanitary fitting connection between a blind threaded port or tank fitting and a screw cap fitting.

Seal systems 10 according to the preferred teachings of the present invention can have various applications and can be utilized in various combinations. FIG. 4 shows use of seal system 10 of FIG. 9B between first and second fitting members 70 and 80 in the preferred form shown as two pipes, with product contact side 86 inside of the two pipes. FIG. 5 shows use of a combination of seal system 10 of FIG. 9A and seal system 10 of FIG. 9B in a tube or pipe coupling of a conduit including first and second fitting members 70 and 80. The conduit passes through a tank or the like containing fluid, with the fluid on inside and outside of the conduit. FIG. 6 shows use of seal system 10 of FIG. 9A in a multiple impeller shaft coupling assembly including a plurality of shafts 94 for operation in fluid, such shafts 94 including blades for agitating the fluid located outside of shafts 94. FIG. 7 shows use of seal system 10 of FIG. 9A in a removable agitator blade design between an impeller blade 90 and a connection element 92. FIG. 8 shows use of seal system 10 of FIG. 9A in a sanitary fitting connection between first fitting member 70 in the preferred form shown as a blinded threaded port or tank fitting 24 and second fitting member 80 in the preferred form shown as a screw cap fitting 26. FIG. 10 shows use of seal system 10 of FIG. 9C in a flange seal between first and second fitting members 70 and 80. FIG. 11 shows use of seal system 10 of FIG. 9A and seal system 10 of FIG. 9D in an agitator bottom bearing seal in a mount 30 including first and second fitting members 70 and 80. FIG. 12 shows use of seal system 10 of FIG. 9D in a bolt application. An optional agitator coupling 'stop' bolt utilizing seal system 10 of the present invention guarantees no backing out during operation. This bolt seal design can also be used for other bolting applications having product contact such as pump impeller retaining bolts.

Likewise, FIG. 16 shows use of a combination of seal system 10 of FIG. 9B and the seal system of FIG. 15A in an agitator bottom bearing seal in a mount 30 including first and second fitting members 70 and 80. For seal system 10 of FIG. 15A, first fitting member 70 includes an annular recess 84 extending perpendicularly to and in communication with annular gap 74. Annular recess 84 has a spacing to product contact side 86 larger than annular groove 20. In this application, seal element 56 having a size smaller than seal 54 acts as a retaining lip, and seal system 10 with seal element 56 is compressed by the ID/OD fit of mount 30, unlike the normal compression method. Specific tolerances are applied for the correct compression. In its most preferred form of TEFLON® material or thermoplastic elastomer type material based installation while screwing or rotating is easy due to the self-lubricating seal system 10 and non-binding of seal 54 in the form of O-ring 12. In this application, the seal is static but is sealed in the rotational direction.

Figure 15K:
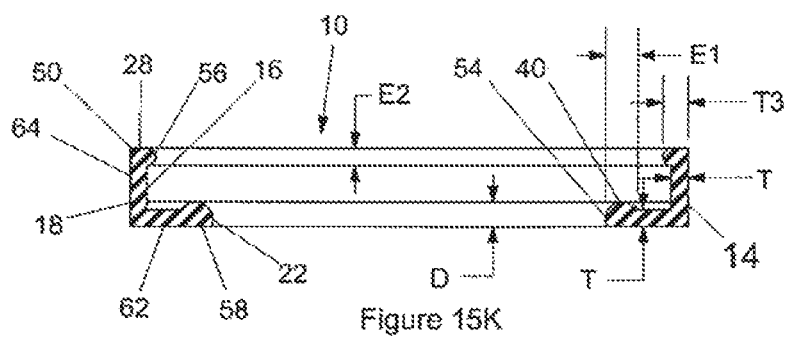
Figure 15L:
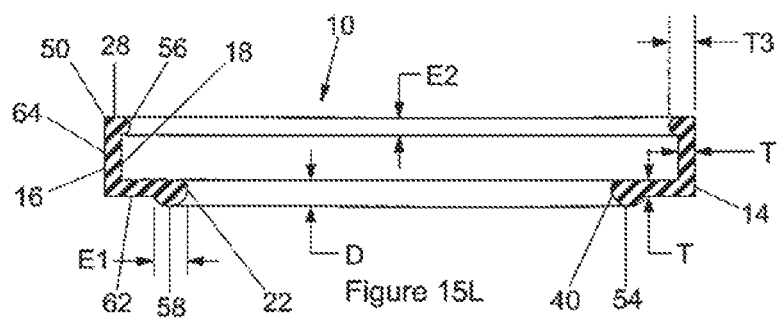

Furthermore, FIG. 17 shows use of seal system 10 of FIG. 15K in a sanitary fitting connection between first fitting member 70 in the preferred form shown as a blind threaded port or tank fitting 32 and second fitting member 80 in the preferred form shown as a screwed pipe/tube fitting 33. It can be appreciated that first fitting member 70 includes an L-shaped annular gap 74 including first and second portions extending generally perpendicularly to each other. Furthermore, first fitting member 70 includes an annular recess 84 extending perpendicularly to and in communication with the second portion of annular gap 74. Annular recess 84 has a spacing to product contact side 86 larger than annular groove 20. L-shaped tail 14 is received in L-shaped annular gap 74, and seal element 56 of a size smaller than seal 54 and acting as a retaining lip is received in annular recess 84.

Further, FIG. 18 shows use of a combination of seal system 10 of FIG. 9A and seal system 10 of FIG. 15B in a stacked hub assembly for an agitator shaft 38 with removable impeller blade and hub assemblies 34 and 35 and a retaining nut 36 with torque alignment pins 37. This application allows agitator impeller blade and hub assemblies 34 and 35 to be installed and removed on agitator shaft 38 while maintaining hygienic sealing effect. Similar to FIG. 16, seal system 10 with seal element 56 of a size smaller than seal 54 and acting as a retaining lip is compressed by the ID/OD fit of retaining nut 36 and agitator shaft 38 in FIG. 18. Unlike the normal compression method, in addition an angle A, ranging from 0-3 degrees, preferable 1 degree, produces a taper to allow a loose fit during initial assembly but ensures the correct compression when assembled completely. Specific tolerances are applied for the correct compression. This angle and compression method can also be applied to FIG. 16 according to the teachings of the present invention.

Seal systems 10 according to the preferred teachings of the present invention allow a flush seal surface and cleanability in product contact side 86. Specifically, conventional flat gaskets can 'extrude' or create 'overhang' which creates cleaning problems. In the application of seal system 10 having seal 54 in the form of O-ring 12 utilized in first and second fitting members 70 and 80 having annular grooves 20 and 21, seal 54 is free of protrusions and exposed on product contact side 86 through a gap between end faces 72 and 82 generally equal to depth D1. Thus, tail 14 and dual side annular grooves 20 and 21 of the seal system according to the teachings of the present invention allow seal 54 to be compressed without being "extruded" and allow easy installation. For example, the seal does not substantially change shape or deform while experiencing the compression force. Seal 54 is allowed to be "pushed out flush" into product contact areas, so that "flat" areas on the product contact side in conventional O-rings that can be more difficult to clean is eliminated in seal systems 10 according to the preferred teachings of the present invention. Smooth profile on the inner or outer diameter of seal 54 and annular grooves 20 and 21 eliminate gasket 'extrusion' and allows better cleanability. For example, the outermost surface of the seal's edge may be aligned with the product facing surfaces of the fittings, but because the seal does not extrude, the seal may maintain its cross-sectional shape at the O-ring section and the rounded edges of the O-ring curve away from the product facing surfaces as the surface transitions radially inwards. In this manner, the edge surface of the O-ring portion of the seal may not be pushed flat on the product contact side of the fittings, which could be more difficult to clean, but an outer perimeter of the seal is still able to be flush with the product contact sides of the fittings. See, for example, FIG. 3.

However, seal 54 can be compressed to a designated amount, such as but not limited to 0.020 inches (0.05 cm) in the preferred form, so extrusion is limited and remains smooth/round. In other words, the material forming the seal is structured to limit the change of shape of the seal when compressed. It can be appreciated that dual sided annular grooves 20 and 21 allow even compression on both sides, which is advantageous over conventional O-ring methods usually employing one-sided machining only. When utilized in agitator couplings, seal 54 remains engaged, unlike conventional O-rings that remain engaged but normally have crevices that can be more difficult to clean.

Seal systems 10 according to the teachings of the present invention including seal 54 and seal element 56 in the form of O-ring 12 and/or semicircular cross sections also provide better cleanability in product contact side 86, because seal 54 and seal element 56 are free of protrusions and are exposed on product contact side 86. Furthermore, seal 54 and seal element 56 have smooth profiles and do not protrude into product contact side 86 so that are no flat areas.

Furthermore, conventional O-ring methods usually require holding a gasket in place until almost tight. Seal systems 10 according to the preferred teachings of the present invention are self-centering for ease of installation. Furthermore, seal element 56 of a size smaller than seal 54 and acting as a retaining lip can hold seal system 10 to allow installation without holding seal systems 10 in place, eliminating the possibility of pinching fingers. Specifically, seal element 56 acting as a retaining lip helps retain seal system 10 during assembly. Seal element 56 acting as a retaining lip is designed to allow easy assembly, especially in blind applications as shown in FIG. 17.

Furthermore, seal systems 10 according to the preferred teachings of the present invention can be tightened/secured without the 'binding and rippling up' which commonly occurs on conventional flat gaskets, O-rings, and other industry standard gaskets and which creates potential for losing the sealing effect and becomes a cleaning issue. Due to self-lubricating in its most preferred form of TEFLON® material or thermoplastic based, seal systems 10 of the present invention allow circumferential direction while achieving a tight compressive sealing effect.

Now that the basic teachings of the present invention have been explained, many extensions and variations will be obvious to one having ordinary skill in the art. For example, although seal 54 and seal element 56 are shown as being of circular or semicircular cross sections, seal 54 and seal element 56 can have other shapes according to the preferred teachings of the present invention including ellipsoidal, race tank shaped, or the like. Further, seal systems 10 according to the preferred teachings of the present invention can be utilized in combination other than those shown.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A hygienic fitting assembly, comprising:
    a first fitting member defining an exterior opening, an interior opening, and a passage extending therebetween, the passage having a first portion at the exterior opening and a second portion at the interior opening;
    a second fitting member receivable into the first portion of the passage and defining a duct configured for alignment with the second portion of the passage, the first and second fitting members configured for removable mechanical attachment with one another along an interface region within the passage;
    a seal formed from a compression controlled and self-lubricating material and configured to receive an annular feature defined by a terminal end of the second fitting member and define a sanitary fitting connection therebetween, wherein the annular feature is a combination of a recess and a projection in the axial face of the fitting member, the sanitary fitting connection operable to prevent fluid escape toward the interface region during flow of a product from the duct and into the second portion of the passage; and
    wherein the seal before and after attachment of the first and second fitting members comprises:
        a first peripheral surface positionable between the first and second fitting members and defining an annular boundary between the duct and the second portion of the passage, wherein the first peripheral surface is defined, in part, by a flat surface that extends annularly about the duct, and wherein the flat surface is mountable on the first fitting member when the second fitting member is received by the seal and removably mechanically attached with the first fitting member,
        a second peripheral surface that extends annularly about the duct, and
        the seal is configured to seat the terminal end between the first and second peripheral surfaces.

2. The hygienic fitting assembly of claim 1, wherein the annular boundary defines a seal between the product and the interface region of the first and second fitting members.

3. The hygienic fitting assembly of claim 2, wherein the first and second fitting members are removably attachable via a threaded connection.

4. The hygienic fitting assembly of claim 3, wherein:
    the first fitting member is defined by one or more features of a tank, at least one of the features of the tank defining the passage, and
    the second fitting member is defined by one or more features of a tube, at least one of the features of the tube defining the duct.

5. The hygienic fitting assembly of claim 1, wherein the seal further comprises:
    a first section extending from the first peripheral surface and defining a first flat surface of the seal, and
    a second section extending from the second peripheral surface and defining a second flat surface of the seal, wherein the first section and the second section are defined irrespective of a mechanical coupling of the first fitting member to the second fitting member.

6. The hygienic fitting assembly of claim 5, wherein the first and second flat surfaces are perpendicular surfaces of the seal.

7. The hygienic fitting assembly of claim 1, wherein:
    the first and second fitting members cooperate to define an L-shaped annular gap within the passage, and
    the seal is seated within the L-shaped annular gap.

8. The hygienic fitting assembly of claim 7, wherein the seal comprises an L-shaped tail that is received within the L-shaped annular gap.

9. The hygienic fitting assembly of claim 7, wherein the L-shaped annular gap comprises a first L-shaped annular gap portion and a second L-shaped annular gap portion, wherein the first and second L-shaped annular gap portions extend generally perpendicular to one another.

10. The hygienic fitting assembly of claim 9, wherein each of the first and second peripheral surfaces are defined, in part, by a circular cross-section, the circular cross-section of each of the first and second peripheral surfaces being adapted for seating in a corresponding one of the first L-shaped annular gap portion and the second L-shaped annular gap portion.

11. The hygienic fitting assembly of claim 1, wherein the seal comprises a pair of annular rings concentrically spaced relative to a longitudinal axis of the passage when the seal defines the sanitary fitting connection.

12. The hygienic fitting assembly of claim 11, wherein the pair of annular rings comprises an outer ring and an inner ring, the inner ring having a size greater than a size of the outer ring.

13. They hygienic fitting assembly of claim 12, wherein the outer ring is seated along an exterior annular surface of the first fitting member and defines a retaining lip therewith.

14. The hygienic fitting assembly of claim 11, wherein:
    the first fitting member and the second fitting member are configured to transition between a tightened and untightened position, and
    the pair of annular rings are configured to center the first fitting member within the passage during the transition.

15. The hygienic fitting assembly of claim 14, wherein the first and second fitting members cooperate to prevent a shape of the seal from changing when the first fitting member and the second fitting member transition between an untightened position and a tightened position when removably mechanically attached to one another.

16. The hygienic fitting assembly of claim 15, wherein the first and second fitting members are arranged to reduce a compression force on the seal when the seal defines a sanitary fitting connection between the first and second fitting members.

17. The hygienic fitting of claim 1, wherein the seal resists deformation during and after coupling of the first fitting member to the second fitting member.

18. A hygienic fitting assembly, comprising:
- a first fitting member defining an exterior opening, an interior opening, and a passage extending therebetween, the passage having a first portion at the exterior opening and a second portion at the interior opening;
- a second fitting member receivable into the first portion of the passage and defining a duct configured for alignment with the second portion of the passage, the first and second fitting members configured for removable mechanical attachment with one another along an interface region within the passage; and
- a seal formed from a compression controlled and self-lubricating material, the seal comprising a substantially circular bead portion and an L-shaped tail portion extending from the bead portion, the seal configured to receive an annular feature of one of the first or second fitting members; wherein the annular feature is a combination of a recess and a projection in the axial face of the fitting member; and the seal defining a sanitary fitting connection between the first and second fitting members, the sanitary fitting connection operable to prevent fluid escape toward the interface region during flow of a product from the duct and into the second portion of the passage.

19. The hygienic fitting of claim 18, wherein the seal resists deformation during and after coupling of the first fitting member to the second fitting member.

20. The hygienic fitting assembly of claim 18, wherein the seal comprises a pair of annular rings concentrically spaced relative to a longitudinal axis of the passage when the seal defines the sanitary fitting connection.

* * * * *